United States Patent
Knight et al.

(10) Patent No.: US 6,571,234 B1
(45) Date of Patent: May 27, 2003

(54) SYSTEM AND METHOD FOR MANAGING ONLINE MESSAGE BOARD

(75) Inventors: Timothy O. Knight, Palo Alto; J. Nicholas Gross, San Francisco, both of CA (US)

(73) Assignee: Prophet Financial Systems, Inc., Palo Alto, CA (US)

(*) Notice: Subject to any disclaimer, the term of this patent is extended or adjusted under 35 U.S.C. 154(b) by 0 days.

(21) Appl. No.: 09/309,712

(22) Filed: May 11, 1999

(51) Int. Cl.[7] .............................................. G06F 17/30
(52) U.S. Cl. .......................... 707/3; 707/7; 709/206; 345/792
(58) Field of Search ................... 707/3, 4, 7, 10; 709/206; 345/700, 968

(56) References Cited

U.S. PATENT DOCUMENTS

| | | | |
|---|---|---|---|
| 4,754,409 A | 6/1988 | Ashford et al. | 364/513 |
| 4,930,071 A | 5/1990 | Tou et al. | 364/300 |
| 5,257,185 A | 10/1993 | Farley et al. | 364/419.19 |
| 5,481,647 A | 1/1996 | Brody et al. | 395/51 |
| 5,704,017 A | 12/1997 | Heckerman et al. | 395/61 |
| 5,761,662 A | 6/1998 | Dasan | 707/10 |
| 5,796,393 A | 8/1998 | MacNaughton et al. | 345/329 |
| 5,799,151 A * | 8/1998 | Hoffer | 345/753 |
| 5,815,663 A | 9/1998 | Uomini | 395/200.49 |
| 5,819,269 A | 10/1998 | Uomini | 707/7 |
| 5,842,195 A | 11/1998 | Peters et al. | 707/1 |
| 5,864,874 A | 1/1999 | Shapiro | 707/201 |
| 5,867,226 A | 2/1999 | Wehmeyer et al. | 348/563 |
| 5,877,759 A | 3/1999 | Bauer | 345/339 |
| 5,886,693 A | 3/1999 | Ho et al. | 345/335 |
| 5,893,098 A | 4/1999 | Peters et al. | 707/10 |
| 5,974,409 A * | 10/1999 | Sanu et al. | 707/3 |
| 5,991,306 A | 11/1999 | Burns et al. | 370/429 |
| 6,035,294 A * | 3/2000 | Fish | 707/2 |
| 6,094,675 A * | 7/2000 | Sunaga et al. | 709/204 |
| 6,141,007 A | 10/2000 | Lebling et al. | 345/339 |
| 6,151,620 A * | 11/2000 | Madsen et al. | 709/204 |
| 6,167,395 A * | 12/2000 | Beck et al. | 707/3 |
| 6,170,011 B1 * | 1/2001 | Beck et al. | 709/224 |
| 6,182,059 B1 * | 1/2001 | Angotti et al. | 706/45 |
| 6,249,282 B1 | 6/2001 | Sutcliffe et al. | 345/331 |
| 6,278,993 B1 | 8/2001 | Kumar et al. | 707/3 |
| 6,282,548 B1 | 8/2001 | Burner et al. | 707/104 |
| 6,285,998 B1 | 9/2001 | Black et al. | 707/4 |
| 6,314,420 B1 | 11/2001 | Lang et al. | 707/3 |

FOREIGN PATENT DOCUMENTS

WO 9948011 9/1999 ............ G06F/13/00

OTHER PUBLICATIONS

Plotnikoff, David "Another Try to Put Some Frontier Back in the Suburban Setting," San Jose Mercury News, Jun. 6, 1999, pp. 1F and 5F.

"RemarQ Raises $20 Million in Equity Funding," RemarQ Press Release Dated Apr. 19, 1999.

(List continued on next page.)

Primary Examiner—John Breene
Assistant Examiner—Debbie M Le
(74) Attorney, Agent, or Firm—J. Nicholas Gross

(57) ABSTRACT

Queries and postings made to an online electronic message board are managed by a number of community and customized software search robots. The robots interact with subscribers to access, retrieve and post messages according to content groupings and classifications that reflect the collective shared interests, desires, etc., of such subscribers. Because the information is already pre-classified and indexed in such fashion, subscribers are given rapid access to key information that is most of interest to them, enhancing their overall experience with the system.

76 Claims, 11 Drawing Sheets

Microfiche Appendix Included
(2 Microfiche, 171 Pages)

OTHER PUBLICATIONS

"RemarQ Provides Lycos.com with Additional Computer-Related Discussions," RemarQ Press Release Dated Jan. 11, 1999.

"RemarQ Forms Alliance with Excite, Bringing Usenet Discussion Group Communities to Every Excite User," RemarQ Press Release Dated Dec. 7, 1998.

"RemarQ Communities Partners with Lycos–Bertelsmann to Bring Localized Internet Discussions to Europe," RemarQ Press Release Dated Mar. 29, 1999.

"RemarQ Communities Partners with IDG.net to Bring Active Y2K Discussions to Year 2000 World Micronetwork," RemarQ Press Release Dated Mar. 29, 1999.

Margonelli, Lisa "The Last Internet Gold Rush," Aug. 7, 1998, [Online:] Available http://www.thestandard.com/articles/article_print/1,1454,1304,00.html, pp. 1–8.

Maddox, Kate "Talkway Signs Up 1$^{st}$ Advertisers," Jun. 6, 1998, [Online:] Available http://adage.com/interactive/artcles/19980608/article2.html, pp. 1–3.

Kerstetter, Jim "Making Usenet Useful," PC Week, May 22, 1998, [Online:] Available http:www.zdnet.com/zdnn/content/pcwk/1521/318094.html, pp. 1–2.

Kirsner, Scott "Making Money in the Net's Yaketeria," May 1, 1998, [Online:] Available http://www.wired/com/news/business/story/12037.html, pp. 1–3.

\* cited by examiner

Trading Reasons — 312, 317, 316

- Charting
  - Basic Patterns
    - Head and Shoulders
    - Inverted Head and Shoulders
    - Rounded Bottom
    - Rounded Top
  - Candlesticks
  - Chart Pattern
  - Gaps
  - Moving Averages
  - Support/Resistance
  - Technical Indicator
  - Trendlines
  - Triangles
- Fundamentals
- Market Activity
- Opinions
- Trading Methods

My ProphetTalk — 330

| | Trading Lessons | Stocks | |
|---|---|---|---|
| Author | Subject | | Date |
| Cal Learner | Re: RedHat Linux BEATS a Cray | 3/22/99 | 1:00 p.m. |
| www.fis.fi | Futures quotes via satellite in Eu | 3/22/99 | 12:58 p.m. |
| BLASH404 | Re: TWMC | 3/22/99 | 12:58 p.m. |
| STEVEN R. GRIESER | Re: 10 stock pick | | |
| Duane Jacobson | Re: Commodity Question? | 3/22/99 | 12:57 p.m. |
| Fred | Golden Sachs Internet Index Fu | 3/22/99 | 12:57 p.m. |

325 — 320

On Sun, 21 Mar 1999 13:40:25 GMT, rforsch@ix.netcom
wrote:
> 
> Yes. CNBC reported it, saying the company was fl
>when the Dow crossed 10,000. (Lemming stampede.)

340 — 345

Previo | Next | Reply | Favorit | Search | Add

Group/Subclass Tabulation

580 →

| Topic | Hits |
|---|---|
| Stock X | ------------ |
| Trading Reason A | ------------ |
|  |  |
|  |  |
|  |  |

Keyword Tabulation

581 →

| Word | Hits |
|---|---|
| Product Y | ------------ |
| Company Y | ------------ |
|  |  |
|  |  |
|  |  |

Author Tabulation- Queries

582 →

| Author | Hits |
|---|---|
| A | ------------ |
| B | ------------ |
|  |  |
|  |  |
|  |  |

Author Tabulation- Postings

583 →

| Word | Hits |
|---|---|
| Product Y | ------------ |
| Company Y | ------------ |
|  |  |
|  |  |
|  |  |

SYSTEM AND METHOD FOR MANAGING ONLINE MESSAGE BOARD

CROSS REFERENCE TO MICROFICHE APPENDIX

Appendix A, which forms part of this disclosure and is incorporated by reference herein, is a microfiche appendix consisting of 2 sheets of microfiche having a total of 171 frames. Microfiche Appendix A is a list of computer programs and related data in an embodiment of the present invention, which is described more completely below.

FIELD OF INVENTION

The present invention relates to managing queries and postings made to an online electronic message board. The invention is especially suited for permitting subscribers to interact with software search robots to access, retrieve and post messages according to classification criteria that mirror the interests, desires, etc., of such subscribers. These features enhance the user's experience with the online message board system, thus increasing the user's interaction time with such system.

COPYRIGHT NOTICE

A portion of the disclosure of this patent document contains material that is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF INVENTION

Online bulletin board systems (BBS) and discussion group boards are well-known in the art. Surprisingly, however, over the past 15 years or so they have failed to evolve significantly in sophistication and/or ease of use. In fact, compared to the developments made in applications software, user interfaces, internet browsers, etc., online message boards are still remarkably primitive.

At this time, some popular stock discussion boards known to applicants are located on the internet at the following locations:

www.dejanews.com
messages.yahoo.com/index.html
boards.fool.com
www.techstocks.com
www.ragingbull.com
www.remarq.com Of these, the fool.com board website maintained by an organization known as "The Motley Fool" is probably the most technologically sophisticated and user-friendly. However, this message board, as with each of the boards above, is constricted by the fact that it relies on HTML coding, which, while easy to implement on the provider side, is relatively static, and not extremely functional from the user's perspective. HTML is also easily handled by conventional user web browsers as well, and this is another reason why it is in widespread use.

A conventional prior art message board is illustrated in FIGS. 1A and 1B. As seen here, an interface 100 for an internet service provider permits the user to visualize a display area 110 which includes a number of posted messages 115 for a particular subject, which, in this case, involves company A. These posted messages are generated by users having access to the website maintained by the service provider, and can include information, commentary, etc., on any one of a variety of different subjects pertaining to company A, such as, for example, discussions of recent stock movements, products offered, press releases, etc. The users (subscribers) of the service provider compose these messages at their local computer systems, and then send (post) the same to a server at the website, where they are screened (usually for improper content), indexed (to identify topic, author, date, etc.) and stored for later retrieval by other users. Each message, therefore, is posted by a user-author within the logical area for Company A according to topic, and date, and such information is usually displayed in a region 115 of display area 110. A list of such messages, therefore, appears to the user when he/she visits the message board, and selects the logical area reserved for Company A. This list for Company A can be organized by topic, author, date, etc. by clicking an activation button associated with each of the labels "Topic," "Author" and/or "Date." An additional set of control buttons 125 can be used by the user to perform such functions as "Request"—i.e., to retrieve the message highlighted by the cursor (the entry marked in shaded form), "Create"—which allows the user to compose a new message for the topic in question, and "Find"—which allows the user to search the list of messages in the topic area for selected content. As seen further in FIG. 1b, when the user Requests a particular message, display area 110 is replaced by a different display area 130, which shows the user the message entry in question. At this point, the user can read the content of the message as provided in area 135, and can then respond to the same by activating a "Reply" button 140. This has the effect, of course, of posting yet another message under the topic in question, identified with an author name corresponding to the user.

This message board system, while commonly used in the industry, is not extremely functional or user friendly. First, from a high level perspective, when first visiting the message board, the user is presented with a first screen as seen in FIG. 1C which forces them to select from a broad area of subjects broken down as Company A, Company B, Company C, etc. This means that a decision must be made by the user early on to narrow the focus of his/her query, and this restricts their later retrieval of relevant material that may be of interest to them. Accordingly, it is not extremely accurate or flexible, since the user must return to this first search staging area anytime they want to change subjects.

Second, assuming that the user is at the second stage of the prior art search interface shown in display area 110, and wants to examine a particular message, display area 110 vanishes from his/her view, so they are unable to jump to any other arbitrary selected message located within the topic area. Instead, the user is confined to moving through the messages (using interface 130, which is essentially yet a third stage of the interface) sequentially, typically using the "Prior" and "Next" buttons shown in area 140, which have the effect of moving backwards/forwards respectively through the list of messages for the topic. Since the display list of all the posted messages from the second stage is now out of sight, the user can experience significant frustration in trying to find another message that may have caught his/her attention during the time they were examining display area 110. The alternative, of course, is to close area 130 and return to the display area 110, and this option does allow the user to see the list again. This alternative is not attractive, however, since it requires additional keystrokes, and has the effect of now closing area 130 so it is no longer visible by the user.

In short, there is no easy way in the art to browse through messages on a bulletin board in random access fashion, or to see both a message list and content for a particular message at the same time. Also, the user must constantly transcend different stages of visual interfaces to move about during the search process, because such stages do not exist in any integrated, harmonized fashion.

Third, while the user is at the second stage of the search process, he/she is limited to seeing the messages in display area 110 as they are stored at the website; in other words, indexed by Topic, Author, Date, etc., but with no additional screening/filtering capability. This means that the user is sometimes (depending on popular the topic is) forced to browse through hundreds of messages (postings) to find an item of interest. While the prior art does allow some searching capability within this second stage, it is relatively primitive in that it cannot transcend the logical area bound by messages for Company A; in other words, it is not possible to search across all subjects for a keyword of interest. Again, this means that the user is not receiving complete information, and this detracts from the appeal of such system. Also, the search constructs possible with the prior system are very limited, and do not allow for advance filtering techniques, so that, for example, the user can use multiple filters to find content. For instance, locating postings by a specific author having specific keywords is not possible at this time. Moreover, within this second stage, the user must formulate and define his/her own search queries for each new query, and then pass this request to the service provider, where it is processed to return relevant hits to the user. This can take time, of course, and because this portion of the interface has no "memory"—in the sense of remembering the user's predilections and search interests/constructs—the user is required to waste time each time he/she visits this stage to re-formulate the search query to retrieve messages of interest. It would be far more advantageous, for example, if the interface could learn, remember, and automate common query and filtering criteria from the user.

These and other noticeable limitations reduce the utility and utilization of message boards, and this in turn results in a number of adverse consequences for service providers, including fewer subscribers, reduced revenue, etc. These limitations, are due, in large part, to limitations in HTML, which do not provide for easy creation and manipulation of active display areas for the user. While other implementations of message boards might provide additional functionality beyond that described for the example above, applicants are nonetheless unaware of any message boards that provide flexible but comprehensive user selection of content.

Furthermore, while more advanced and useful interfaces exist for other applications, they have not been successfully adapted to date in connection with a message board system. For example, a conventional commercial news reader by Netscape is illustrated generally in FIG. 1D. This program has the advantage of a flexible interface for reviewing news stories, but does not provide any intelligent support for multiple levels of bulletin board message organization, message querying, etc. In other words, the content sources (on the left side of the screen) are simply newsgroups, which represent data that is in raw, unorganized and non-descriptive form as posted by various individuals within such newsgroups. The user is left to guess and wonder about the nature and scope of the various selections (newsgroups), and/or what subject matter, classes, sub-classes, etc., are within such selections. As the message items are created by individuals, it is often the case that these message items are not placed within an appropriate category (newsgroup), because the user does not have the time, interest or inclination to make certain that his/her message is placed in the right area for others to see it. Thus, the raw data examined by such interface is not intelligently created ab initio, and this means that it is not classified or managed (i.e. by subject matter/class, or in accordance with groupings that might be more germane to a particular community of users). This lack of organization in the content, of course, handicaps the functionality of the interface as well. Consequently, while this interface has some apparent advantages that could be imparted to bulletin board systems, it does not provide an optimal solution to the overall problem of identifying relevant content for a group of users, and then providing a tool for easily locating and browsing through such content.

Unlike most other application programs, most prior art online message boards have no flexible front end; thus, it is extremely difficult to identify, cull out and review large collections of unorganized messages. Moreover, the content presented at such sites, and the ways for presenting such content to subscribers, is left entirely to the discretion of the service provider. There is no effort made to intelligently monitor the needs, interests, etc., of the subscribers, and/or to find/tailor content (and/or its expression) based on such observations. Accordingly, such online message board systems do not truly or accurately reflect the needs, interests, etc., of its users, which reduces their appeal and attractiveness to users. This in turn means reduced advertising revenues and/or subscriber fees.

These limitations in prior art message boards have also inhibited true electronic "community" based mass sharing and learning of information content. In other words, the apparent initial promise of the Internet to bring together thousands of users so that they can collectively share information, opinions, insights, lessons, etc., has not been effectively realized to date. In large part this is due to a combination of factors, including the fact that information content from users and other sources is not created initially or maintained by service providers in a manner that makes it efficiently processable for user perusals. Even then, as noted above, retrieving this information in any intelligent fashion is stilted significantly by limitations in the search/retrieval interface engines of current bulletin board systems used by service providers. In short, there is an abundance of data online that would be of interest to broad classes of users, but no easy way to extract meaningful information, because it must be manually reviewed in inefficient ways. Accordingly, the creation of true collective intelligence electronic communities would be considerably enhances by a system that gathers and stores information from the community members automatically and intelligently, and then permits users in such community to be able to easily, flexibly and controllably glean and share selected insight from the experience, opinions, actions and facts from other users.

Tying all these factors together, it is apparent, too, that there is considerable need for an improved online service that integrates an intelligent data collection and indexing system with a more functional, easy to use front end interface for analyzing such data.

SUMMARY OF THE INVENTION

The present invention aims to provide a system and method for overcoming the aforementioned problems in the prior art.

One object of the present invention, therefore, is to provide a system and method for implementing an online data service that includes intelligent data content gathering, storage and retrieval, so that interests of subscribers of such data service are taken into consideration for purposes of building content, interfaces, or subject matter classifications used in such service;

A related object of the present invention is that such online data service be able to better provide a community of users with easier information extraction, so that users can filter, consolidate and learn from their collective experiences, knowledge and opinions of other community members;

A further object of the present invention is that such online data service be able to consider the previously defined interests of its members, or their status level within such community, while interacting with such users, so that such users are afforded treatment commensurate with their needs and standing in such community;

Yet another related object of the present invention is to provide an online data service which intelligently stores message content, and dynamically builds additional content of interest to the users of the same in the form of content subject matter groupings, classes and sub-classes, so that content query clusters are easily accessible and reviewable at any time by users without additional processing or time delays;

A still further related object is to provide capability for such online data service to collect, review and analyze posting and query entries by users, so that information from the same can be polled, tabulated, indexed and presented in forms that are of interest to the users of such online data service;

Another associated object of the present invention is to furnish an improved system and method for handling message traffic on an online bulletin board system;

A related object of the present invention is to provide users with an integrated and unified graphical interface for posting and retrieving messages from an online bulletin board system which interface is flexible and highly functional;

Still another related object of the present invention is to provide functionality in such graphical interface for permitting a user to view the aforementioned content query clusters, as well as other information tabulated by the online data service;

Yet another related object is to permit a user of an online service to interact with search robots located on an internet server to help formulate, execute and remember search queries of interest to such user.

A preferred message management system of the present invention can be used with an online electronic message board, and generally includes: a content sorting routine that runs on a computer associated with the message board system for sorting electronic messages and storing them such that they are searchable by users according to information categories. A second query handling routine also executing on this same computer is configured so that: (i) it can receive a user query initiated within a user query interface operating on the user's computer system, and (ii) it can locate a selected set of electronic messages in response to the user query; and (iii) it can transmit such selected set of electronic messages to the user query routine interface in a form suitable for perceiving by the user. The query handling routine is preferably implemented as a set of community and customized search robots. Thus, for ease of searching, reviewing, etc., the message management system interacts with the user using only a single screen display portion of the user query interface.

As noted above, the user query is based on predefined query parameters available to all of the users within the user query interface, so that they correspond directly to the predefined information categories, and everyone using the message board can access such messages using community based robots. A user query can also be handled, however, when it is instead based on customized query parameters for a particular user, so that a customized search robot on the message management system is invoked for locating the relevant electronic messages. These latter types of electronic messages may or may not be made available to all users of the system, depending on the message board system provider's preference.

A message posting routine receives and stores subscriber message data items. These subscriber message data items are preferably coded so that they can also be classified and located based on predefined information categories.

In another aspect of this invention, the query handling routine automatically downloads those messages corresponding to information categories previously indicated as of most interest to the particular user. This can occur at the beginning of a session, or during idle periods, so that the user is given a faster response time for messages of interest to him/her.

A tracking system of the present invention monitors and analyzes message content traffic from the subscribers and other sources. For example, this routine preferably examines user query parameters, retrieved messages, user postings, retrieved content from off site locations, etc., This analysis can be used to tabulate data pertaining to frequency of information category usage, user author preferences, interface preferences, etc., and can be made available to the users of the message board. This information can also be used for automatically modifying the user interface on a periodic basis (to reflect common usage patterns) to improve the look and feel of the same, for determining new potential subject areas for content extraction, for adding/modifying new groups and/or classes for subscriber message data items, etc.

A content building system of the present invention operating on the message board system facilitates building a database of information items accessible by the online subscribers. In this system, a content extraction program locates and extracts selected information from one or more remote online network servers, based on search criteria specified by an operator of the message board system. A sorting program sorts the selected information, as well as subscriber messages, in accordance with a classification scheme, which is also specified by the operator. This results in a plurality of data files of sorted information items, each of the sorted information items being coded to fall within one or more categories of the classification scheme. Thereafter, information items can be located and reviewed by subscribers through subscriber queries performed in accordance with subscriber selected query parameters logically related to one or more categories of said classification scheme. A database management program integrates and storing the selected information and subscriber messages in conventional fashion.

Another aspect of this invention is that the search criterion and classification scheme are based in part on recommendations provided by the aforementioned message tracking system, or are automatically generated. A prioritization scheme for retrieving content is also preferably correlated with a frequency of occurrence of subject categories used in subscriber messages and/or subscriber queries, so that information for subject categories occurring more frequently is retrieved at a higher priority than information for subject categories occurring less frequently. In this manner, the system automatically builds content in proportion to subscriber popularity of such content, such that information for any particular type of content is retrieved at a rate proportional to such subscriber popularity.

A preferred embodiment of an electronic message board system for use by a community of users includes the aforementioned routines of the message management system, tracking system, and content building systems. Such message board system preferably monitors the interests of its users, so that content extraction decisions, content extraction scheduling decisions, message classifications, and interfaces are continuously modified or tuned to reflect feedback gleaned from studying such preferences. In another variation of the invention, user requests (queries, postings, etc.) are prioritized based on status levels of the users.

The methods practiced by the aforementioned message management system, tracking system, content building system and electronic message board system represent other useful aspects of the present inventions that can be employed advantageously in connection with a online message board, and are further described herein.

Although the invention is described below in a preferred embodiment associated with an online bulletin board system dedicated primarily to business information for trading financial instruments, it will be apparent to those skilled in the art that the present invention would be beneficially used in many other applications where it is desirable to provide users with a fast, easy, and comprehensive system that minimizes burden on a user searching for relevant data content.

BRIEF DESCRIPTION OF THE DRAWINGS

Figure 1D:
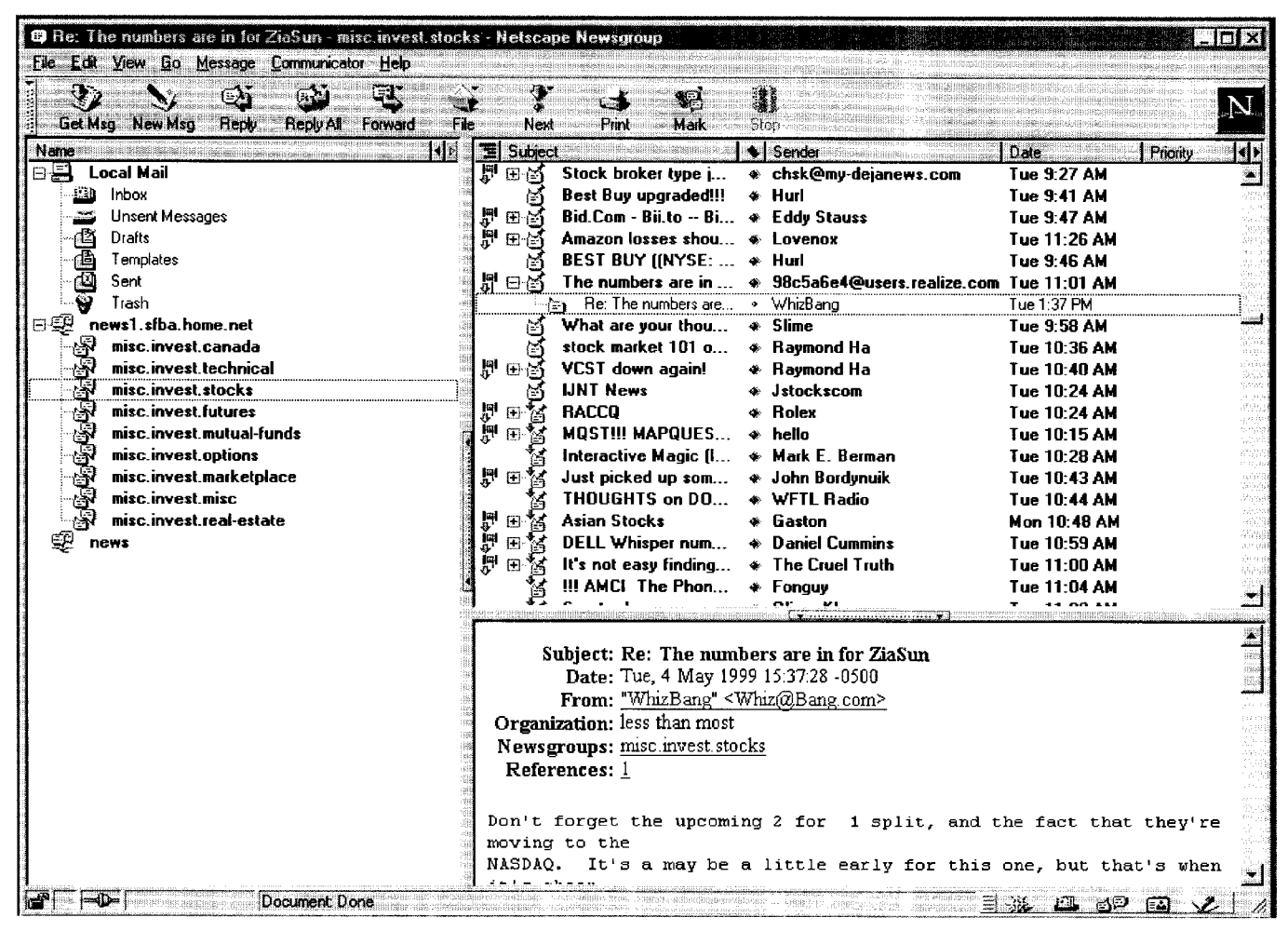

FIG. 1d is a screen capture of a commonly used prior art news reader.

FIG. 3b is a visual depiction of the format of a preferred embodiment of a message board interface of the present invention as it appears to an online user looking at the same with a conventional internet browser.

FIG. 5a illustrates examples of tabulation databases used with the present inventions.

DETAILED DESCRIPTION OF THE INVENTION

Overview of System Components and Functions

Figures 1A, 1B, 1C:
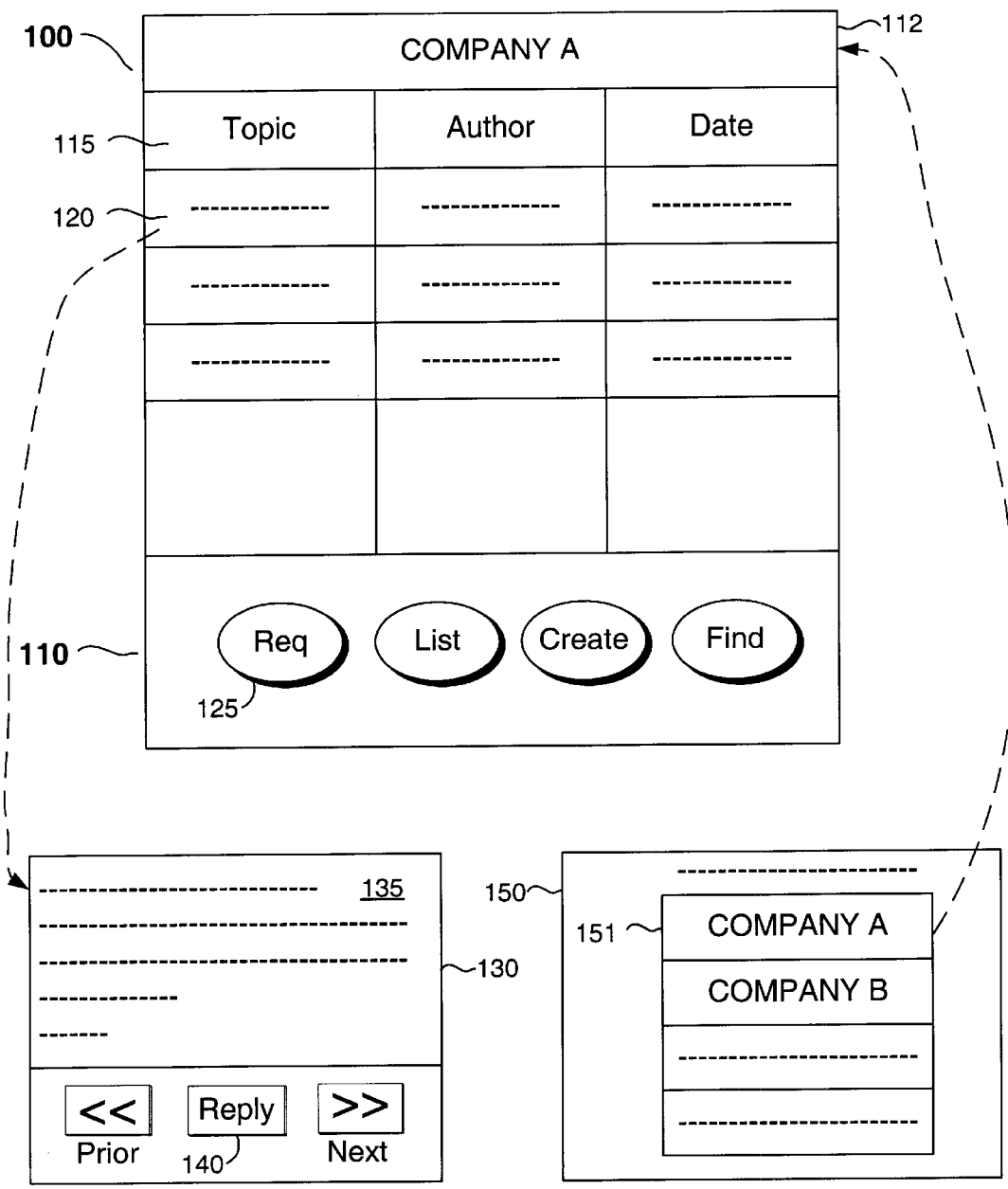
FIGS. 1a–1c are visual depictions of the format of a typical prior art message board as it appears to an online user looking at the same with a conventional internet browser.
Figure 2:
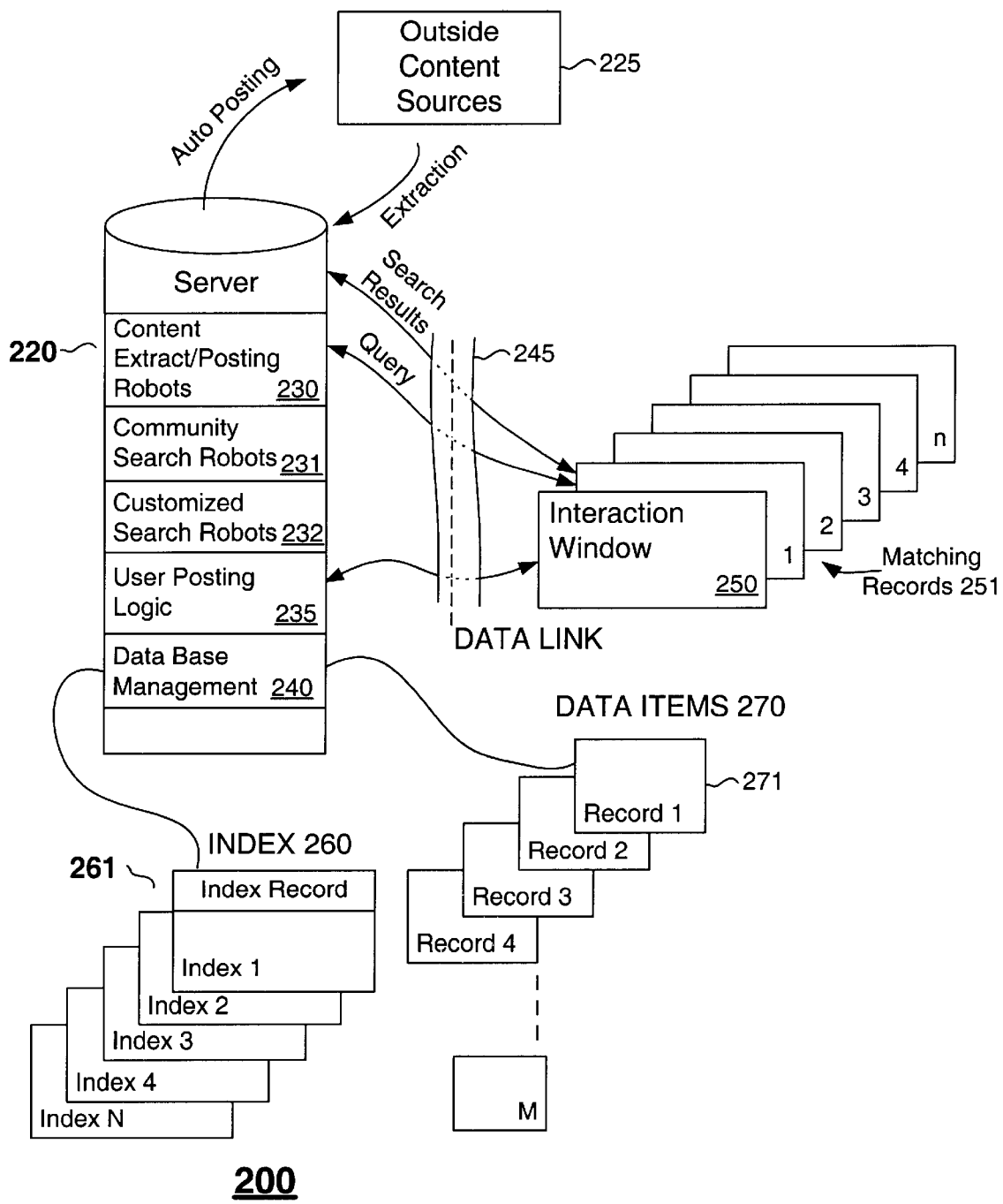
FIG. 2 is a block diagram illustrating various facets of the present invention, including a preferred embodiment of an online electronic message board system that extracts content from various online sources and interacts with a graphical user interface designed for querying such content on such system.

FIG. 2 illustrates the main components of various facets of the present invention. A preferred embodiment of an online electronic message board system 200 includes a high speed, high capacity network server 220 used by an online service provider. Server 220 includes a number and variety of software routines for servicing the functional and operational requirements of the online service provider.

First, to keep the online service with current information of interest to the community of users of such service, a number of independent software content extraction/posting robots 230 perform raw data content extraction, on an as-needed basis, from content sources 225 using a set of program routines suitable for execution on server 220. Community search robots 231 and customized search robots 232 help build predefined collections of message postings from such raw content, based in accordance with broad and narrow guidelines as discussed in more detail below. These predefined collections of message postings provide a significant improvement over the prior art, which, as mentioned above, merely uses raw content feeds for users. Instead of having to manually review and sort out which newsgroups may be of interest, the present system does all the work for the user, and breaks the data down into clear, manageable categories that are easily understood, and more importantly, logically structured to mirror interests and organizational constructs within the community of users.

As used herein, the term "content" is intended in its broadest sense to encompass not only electronic text documents that can be rendered into human-readable form, but also images, pictures, audio recordings, and other data forms which can be processed, sorted and stored in electronic form for later retrieval by a human operator. Further as used herein, the term "message" can refer to a type of content, as well as explicit and implicit information carried in or as part of such content, which information can be used for deriving the substance, meaning and/or appropriate classification of such message.

Generally speaking, the term "postings" refer to content/messages generated by human users. Contributions from subscriber-user postings of messages are handled by posting logic routine 235. Finally, a database routine 240 executing on server 220 maintains a database of data items 242, and constructs indexes 241 of the same in accordance with rules, instructions and feedback from the service provider, and in cooperation with community search robots 231 and customized search robots 232.

These routines form the essential parts of the software on server 220 as viewed from the perspective of the present invention, but it is understood, of course, that other important and necessary software components of server 220 have been omitted for purposes of clarifying the teachings of the present inventions. As used herein, a "robot" generally refers to an intelligent software based agent that can be programmed to automatically perform a series of tasks under very flexible rules and conditions.

Connected to server 220 across a data link 245 (such as a telephone line) is a user computer system (not shown) running a conventional web browser (also not shown) for viewing and interacting with programs and data located at a website maintained by server 220. The details of the user's computer system and web browser are not material to the present invention, and are therefore not discussed at length here. The only important criterion is that such web browser and computer system have the capability of handling Java™ based applets (or similarly capable code) which applets contain software code associated with permitting the user to operate/interact with interaction window 250, community search robots 231, customized search robots 232, and posting logic 235. In general, interaction window 250 is a highly flexible, integrated interactive window that facilitates message search query formulations, message retrievals, message postings, etc., on the part of the user. In response to such message queries, search robots on server 220 return a number of "hits" or matching records 251. The manner in which interactive window 250 assists in these operations and coordinates with posting logic 235 and search robot 230 is discussed in more detail below in connection with FIG. 3.

Returning to the operation of the search robots in FIG. 2: search robots are well-known in the art, and a basic variation of these can be found in conventional online search engines operated by such online providers as Yahoo!, Excite, AOL, etc. These search robots can be easily modified to perform various tasks associated with the present inventions. In particular, a first kind of extraction robot 230 of the present invention periodically retrieve content (i.e., material that may be of general interest to the subscribers to the online service provider) from outside source such as UseNet and/or other online message board systems. The content is "extracted" from these sources according to set of rules, filters or criteria specified by the online provider, and/or gleaned from community based traffic monitorings as noted below. This process can be highly automated so that, for example, a particular search robot can be instructed to search at a particular time of the day for information concerning a particular company at a particular third party internet server. The benefits of this approach include the fact that the message board system 200 provides up-to date, comprehensive content on a variety of subjects.

Furthermore, this content is intelligently classified in accordance with the concepts commonly understood by the user and/or the community, so that the need for manual, cumbersome review of individual messages throughout dozens of newgroups with non-illuminating identifiers (newsgroups tend to have cryptic, non-helpful names that do not distinguish between subject areas very well) is substantially eliminated. This results in greater enjoyment and less frustration for users during an interactive online session.

In practice, content extraction robots 230 are used initially by the service provider to construct an initial content base before the message board system is opened up for subscribers. This ensures that the users of such service will have a preexisting library of information to draw upon when the service is first used. Before this point, however, the information is broken down and sorted into a number of subject matter areas, which subject matter areas represent logical collections of content according to a (potentially different) set of service provider (or user) specific rules, filters, criteria, etc. These logical groupings are based both on perceived interests of the subscribers of the online service provider, and the requirements of database management routine 240.

For example, a service provider may request that a search robot 230 extract content (in this case, posted messages, press releases, news reports, etc.) about companies in a particular industry from a particular discussion board and/or news site. After receiving content from such source, it can be stored in database 270. At the same time, or after this point, this information can be divided according to a sorting mechanism that includes such groupings as (1) stock trading related information (i.e., stock price, patterns, fundamentals, and the like); (2) product related information; (3) marketing related information; (4) sales/financial information; (5) author/source; (6) date, etc. The information in these subject matter areas is then broken down further into class and sub-classifications as desired, and then stored as additional indices 261 by database management routine 240. This process is dynamic, iterative, and continuous, so that a number of community/custom search robots may be simultaneously parsing database 270 to create, update or remove their associated subject matter area/class/subclass indices. In contrast to community search robots 231, whose efforts result in compilations/indices usable by the community as a whole, customized search robots 232 create logical collections of messages based on individual user filtering criteria. To ensure that the independent functionality provided by customized search robots 232 does not overwhelm server 220, only a limited number of such robots are made available to subscribers.

These implementations are but examples, of course, and the actual number of subject matter areas/classifications/subclassifications, etc. will be a function of the subject matter in question, the needs/desires of the target subscriber base of the service provider, the capabilities and storage of server 220, and similar considerations. As discussed below, search robots 231 and 232 also have the capacity to be programmed with feedback information gleaned concerning the interests of users of the online service as they post entries through posting logic 235, and this feature permits them to further define and automatically create content subject matter areas that are of interest to such users.

Database management routine 240 is generally responsible for coordinating data storage and retrieval operations. As data is received (in the form of outside content or user postings) it is stored in record form in one more data files 270 in conventional fashion. In addition, however, logical indexes 261 are also created by database management routine 240, so that such records are easily accessible in accordance with the aforementioned clustering/sorting mechanisms. In general, the structure and operation of database management routine 240 is fairly conventional, and therefore any contemporary server database management software package (i.e., such as DB2) can be used with the present invention if properly configured to interact with the various extraction and search robots and posting logic 235.

Posting logic software routine 235 interacts with interaction window 250 through data link 245, and operates primarily to process messages/content added by users of the online data service. In other words, as users create messages/content, they can "post" this information at the website maintained by server 220, so that other users can later retrieve and examine the same.

Details of User Interaction Window

Figure 3A:
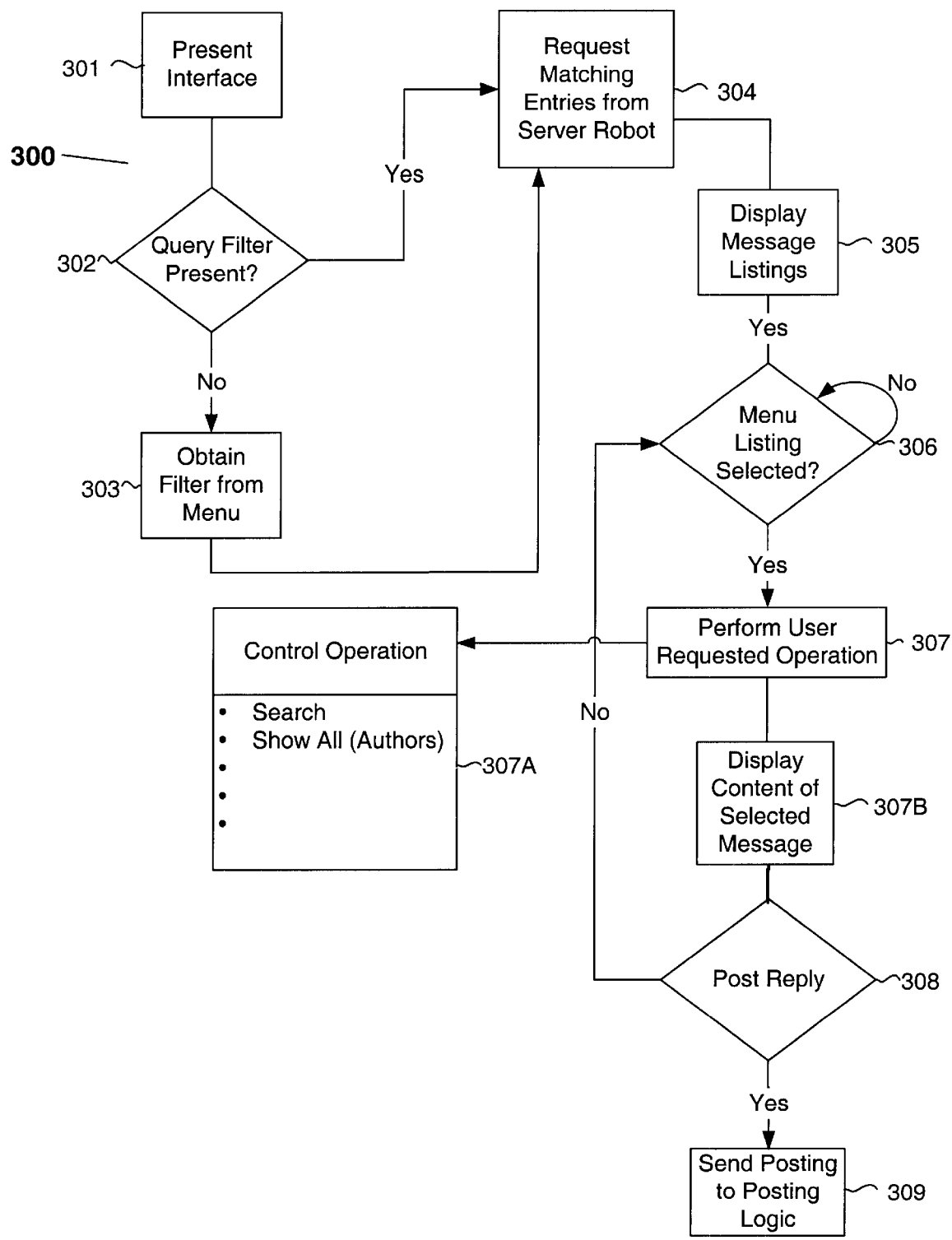
FIG. 3a is a flow chart illustrating the basic operation of the message board graphical user interface of the present invention.

FIG. 3a is a flow chart illustrating the basic operation of an interactive window interface 300 implemented as part of an application program that is downloaded from the remote server as one or more Java™ applets, and which program thereafter is executed within a conventional internet browser program by a java virtual machine on the user's computer system. In a preferred embodiment the present interface is used in connection with a message/bulletin board system 200 to permit individual and community based online sharing of such information as: (1) motivations, opinions, reasonings, etc. for trading financial instruments; (2) company and/or commodity information; (3) equity and/or commodity pricing, pricing patterns, volume patterns, etc. As will become apparent, this interface is logically constructed and presented to the user in a manner that exploits the convenient and intelligent organization of the message data as it was created earlier, so that it can provide functionality that is far superior to the prior art interfaces described above. A preferred embodiment of such system, identified as "ProphetTalk," can be visited online at a website maintained by the assignee at www.ProphetTalk.com. While the present embodiment is presented in the context of a financial discussion groups message board system, the present invention can be used in connection with electronic communities interested in a variety of subject matter, and is not limited therefore in this respect.

During an interactive online session at step 301 the user has already established connection with the online service provider, and has accessed the main website page maintained by server 220 in conventional fashion using any well-known web browser. At this point, the user is presented with a single message search/display screen, containing separate screen display areas for subject matter area query buttons, listings of messages, substance of such messages, subject matter area query menus, control buttons, and other conventional window manipulation tools (scrolling, sizing, etc.).

At step 302, if there is no query filter already in place, the user is permitted to activate one of the subject matter area query buttons, so that a detailed subject matter area query menu is presented. For example, the user may be interested in looking at message entries posted under the broad subject matter area "Stocks." Depressing this subject matter area query button causes the subject matter area query menu to display a number of classifications falling under such group subject matter, such as, in the case of a Stock subject matter area query, classifications corresponding to companies sorted alphabetically. At this step 303, therefore, the user can select messages falling under the classification "Company A" for example. Alternatively, in lieu of looking under subject matter area "Stocks," the user can instead activate a "Custom" subject matter area query button, and formulate a new filter or search query based on such subject matter area filtering. In any event, at step 304, in response to the user specified search parameters, a request is sent to community search robot 231 (or customized search robot 232) at server 220, which in turn queries database management routine 240 to retrieve entries meeting the user's search/filter criteria. Because these entries are already indexed according to predefined subject matter area/class/subclass indices 261, a group of the same matching the user's query criteria are easily and rapidly located. These entries are then transmitted to the user's computer system, and presented in abbreviated listing format (i.e., author, date, excerpt from entry, etc.) within a group listing area of the interactive window interface at step 305. When the user selects one of the retrieved entries from the group of messages at step 306, the full text of the message is displayed in a separate message content detailed display area at step 307 where it can be viewed in its entirety without losing view of the retrieved message group listing area.

The user can then continue to review retrieved messages from the retrieved group using conventional scrolling buttons, or even reply to one or more of the same at step 308. At such time, a message entry is sent from the user's computer system to server 220 where it is posted by posting logic 235 to an appropriate subject matter area/class/subclass index 241 based on both the content and context of the message entry. By this it is meant that every posting is analyzed by posting logic 235 to determine where it should be classified, and that such analysis can entail either: (1) always tagging the posting with the same subject matter area/class/subclass identifier as the entry it is responding to (when this is the case); (2) tagging the posting with an identifier based on the subject matter area/class/subclass filter in place at the user interface at the time of the posting (when not replying to a posting); and/or (3) processing the text of the posting to determine where it should be classified. In any event, each posting is sorted and/or tagged with one or more additional parameter field(s) specifying one or more categories which such posting should fall under. In other words, unlike the prior art, which only indexes the text of messages usually for later search retrieval, the present invention also intelligently classifies and stores messages by subject matter area/class/subclass in advance based on understanding the context of the posting. For example, if a user responds with a reply posting to an original posting in a particular subject matter area, the present invention tags the reply posting with a parameter field specifying that the reply posting should also be classified in the same area as the original posting. Other potential classifications/subclassifications can be given to messages depending on logical inferences that can be drawn from their substance. For example, while a message might only mention a particular company name, it may be desirable to also classify such message by industry area as well, since this latter information is usually discernible from the company name. Thus, such reply message would include classification parameters corresponding to two different subclassifications, including by company name and by industry, and could later be retrieved by either sub-classification selection. Finally, when posting replies, the user is given the option of sending the reply only where it can be seen by other authorized members of the community (i.e., subscribers to the online service provider) or to other third party message board systems (i.e., locations from which content is being extracted by extraction robots 230). In the latter case, extraction robots 230 can be given functionality for both posting and extracting operations for a particular third party content provider.

While the operation of the present interactive interface window from a temporal perspective appears similar to that of prior art systems, the differences are actually quite dramatic. This is because, as illustrated better in FIG. 3*b*, all of the operations described with reference to FIG. 3*a*, occur simultaneously within a single window. In other words, unlike prior art message board systems, the user of the present invention can select broad group/subject matter areas, and then search, list and review groups of message entries all within a single, unchanging visual interface. The complete search/retrieval experience takes place in the context of a simple, dynamic, and flexible interface, and this results in improved ease of use, superior navigability, etc.

FIG. 3*b* depicts the screen appearance of a preferred embodiment of a message board interface 300 of the present invention, as such would appear to an online user using a conventional internet browser. As suggested earlier, this message board interface 300 is implemented as part of a program based on a Java™ applet that is downloaded into the user's computing system by server 220. As used herein, the term "interface" refers generally to either/both the code for such applet and/or the physical manifestations of images and input/output mechanisms provided by such code in connection with the user's computer system.

As mentioned above, the present interface provides several advantages over prior art systems, because it is extremely flexible and comprehensive while still very easy to use. For example, to find material of interest, the user is not forced to waste time navigating through numerous and confusing subject matter area reduction filters presented in serial fashion as is typical of the prior art. As mentioned above, the conventional prior art system requires the user to work with at least three separate and disparate search levels. In contrast, in the present invention, subject matter area control buttons 312 allow the user to identify an initial broad area of search for a group of logically related messages. This can include, for example, messages relating to various broad reasons and lessons discussed by other users of the online service provider (or as found in the third party content areas) identified under the headers "Trading Reasons" and "Trading Lessons" respectively; messages relating to particular company stocks, identified under the "Stocks" header; or even messages relating to specific customized areas of interest to the user grouped under the header of "My Preferences." Again, these are but examples of useful subject matter headings in the field of financial discussion groups, and specific identifications of subject matter will vary according to the area of interest.

The user selects a message subject matter area, therefore, by depressing any one of the control buttons 312. At that time, the user is then presented in a first display area 315 with a more detailed subject matter area menu 316 consisting of options for narrowing their query, in the form of individual message query filter parameters 317, which correspond to classifications of messages that have been pre-indexed under the particular subject matter area. For example, as illustrated in FIG. 3b, after clicking on the subject matter area button "Trading Reasons," a number of more specific classifications are presented as message query filter parameters 317 to the user in expandable tree format. Thus, unlike the prior art, the user is not required to change screens to select a new subject area (i.e., by moving back one level), and can move on to the next level of a more specific logical search of messages (i.e., classifications) without changing screens.

The menu 316 of parameters 317 is presented visually to the user in what is known in conventional terms as a tree-structured menu. Preferably, for ease of use, this tree menu has a shallow depth (i.e., number of levels) and reasonable breadth (i.e., number of items per level) that is manageable, and which permits a user to visualize all possible selections without having to perform time consuming scrolling operations. Generation of tree-structured menus is well-known in the art, and so will not be discussed at length here. The use of a tree-structured menu is especially advantageous within the context of the present invention, nonetheless, since it permits a user to rapidly identify those filtering parameters corresponding to reasons cited by community members as affecting or motivating their behavior. These reasons are set up as subject matter area-classifications, so that they are pre-indexed by database routine 240 and easily located and retrieved from index 260.

Again, in the present preferred embodiment, the query filter parameters 317 presented here as classifications falling under the subject matter area header "Trading Reasons," are factors commonly associated with actions or transactions (buying or selling) securities or options. These include such factors as technical charting indicators, specific events that may affect the stock price (a split announcement for example), rumors, tips from friends, etc. These factors (classifications) are broken into subclassifications as well, which are viewable by clicking on the "+" symbol for such parameter 317. For instance, classification "Charting" is broken down into 9 sub-classifications identified as "Basic Patterns," "Candlesticks," "Chart Pattern," "Gaps," "Moving Averages," "Support/Resistance," "Technical Indicators," "Trendlines," and "Triangles." The user can query and find all messages falling under the general classification "Charting," or, alternatively, can select one of the sub-classifications instead. At an even more granular or controlled level, the user can search messages falling into various sub-classifications within the sub-group "Basic Patterns," such as those relating to "Head and Shoulders," "Inverted Head & Shoulders," "Rounded Bottom, "Rounded Top," etc., all of which are commonly understood technical analysis tools in the field of financial instrument trading. It should be apparent that such classifications, sub-classifications, etc. are merely illustrative of the parameters that could be identified in menu 316, and that the present invention is not limited to any specific set of the same. For example, in an interface geared towards the automotive field, classes may include national origins of vehicles (i.e., USA, Sweden, etc.). Sub-classes might include particular makes of vehicles (i.e., Chevrolet, Saab, etc.) Further sub-classes might include particular messages indexed for quality, warranty, price, performance, luxury, reliability, and so on. The particular implementation of the menu, of course, can be tailored to the features/functions associated with the message board system in question, so that reasonable allowance is made for variations in the content of such messages.

It can be seen, immediately, that the benefits of intelligently classifying the message data items from the very beginning (i.e., in a manner that reflects common logical constructs used within the particular community of users) means that the user can more easily locate information of interest from the interface as well, if the latter is set up to utilize such classifications. In contrast, with the prior art system, the user might have to manually explore dozens of raw newsgroups before hitting on a relevant message that contains information relating to charting techniques as noted above. If the user then adds such newsgroup to his/her preferences, the chances of finding more content within such group relating to charting techniques may, in fact, be very slim, because of the fact that people rarely take the time to make sure that subject matter is correctly classified within a particular newsgroup. This is due, of course, to the fact that newgroups themselves are not logically arranged in a manner that makes this easy to do. Thus, if the user has configured his/her interface in the same way to include other newsgroups for the same reason, the problem is multiplied, and the experience is even more frustrating because of the lack of correlation between the user's preferences (i.e., a desire to see material pertaining to charting techniques) and the material actually presented to him/her (a large number of message on completely unrelated topics). While some prior art message systems attempt to organize the raw newsgroup data, they do so only in minimal fashion; i.e., by grouping individual raw newsgroups within broader headings such as "Finance," "Health," etc. There is no attempt made to analyze and/or intelligently classify the substance of the messages within such raw data feeds. Thus, there is, in effect, no easy or convenient method in the prior art for the user to have large amounts of raw data broken down and structured in logical clusters of data pertaining to concepts that are of most interest to him/her, or the community as a whole.

Another subject matter area control button 312 corresponds generally to "Trading Lessons" learned by subscribers from a particular action/transaction. The menu for this subject matter area can include collections of information that allow community members to quickly isolate and understand collective learnings of the community as a whole. For example, the user can filter messages based on a category corresponding to messages by persons who purchased a stock too early, and what characterized such transaction, so that others can learn from common mistakes. In this fashion, the reasons, lessons, etc., of the entire community of users, created in raw, unorganized form, can nevertheless be processed, reviewed and understood by other users according to the latter's needs, interests, etc.

Similarly, another subject matter area control button 312 includes collections of messages corresponding to categories of information collected and sorted for particular companies, industries, etc.

In any event, at this time, with menu 316 displayed, a second, more refined searching operation, or query, can be effectuated by the user by selecting any one (or more) of the query parameters 317, so that message falling under such classification can be retrieved. This query is sent to community search robot 231 as noted above, so the user can query all the records in database 242 on server 220. This additional level of filtering and selection gives the present invention an additional advantage over the prior art because, again, this operation can take place without changing levels, screens, etc. Moreover, very few prior art systems known to applicants permit searching of messages in the first place; this means that records in the message database are usually reviewed in serial, sequential fashion which is slow and unproductive. More importantly as messages are extracted and posted, they are continuously built as collections of messages falling within a particular predefined subject matter area/class/subclass index, corresponding to the message query filter parameters 317 presented in the user interface. In other words, when the user picks the "Rounded Top" subclass noted in FIG. 3b, there is already a predefined index 241 that has been built to contain all the relevant messages corresponding to this subclass/filtering selection. Notably, within the server database 242, messages grouped under the subclass "Rounded Top" are placed there according to sorting logic as mentioned above, so that for example, when responding to a message in the "Rounded Top" sub-category area, the response itself would also fall within this area, despite the fact that it may contain no mention of this term anywhere in the response.

Accordingly, during a query operation of the present invention, the messages can be searched in a manner that goes far beyond that available in the art, because it is not limited simply searching the actual text of the message itself. Instead, queries are performed on pre-defined, logical groupings of subject matter already constructed for the user's convenience. In this manner, the user's interaction with the system is greatly facilitated and enhanced, because they can find, explore and review relevant subject matter messages in a manner not possible with conventional prior art message board system using large collections of unorganized data. In essence, a message board system of the present invention operates as a kind of vigilant and diligent electronic librarian, constantly processing message items (extracting raw content or and classifying user postings) as they are presented to the system, so that they can be easily retrieved in logical clusters that are most intuitive from the perspective of persons involved in a particular field of interest, such as finance, medicine, entertainment, health, etc.

The subject matter area control buttons are also coded so that if the user moves the cursor under the button marked "Stocks," for example, it is highlighted to provide visual feedback to the user, and when activated, the button marked "Trading Reasons" is moved to make way for the new "Stock" labelled control button. The corresponding message query filter parameters for this subject area would then be made visible in first area 315.

As the appropriate group of messages are located by community search robot 231, a visible listing of the same is provided to the user in a second display area 320, in what can be thought of essentially as a retrieved message listing display area, or a message group detail area. In this area, each message matching the user-selected filter is identified by an entry 325 that lists such data as subject, author, date, and/or a few words excerpted (usually the first few words) for such message. As they are all generally related to the same logical "topic" (by virtue of the query operation) it is not necessary at this stage to waste display space in this area by including a description for this parameter. After all the matching entries of the group are retrieved, they can be sorted in conventional fashion (i.e., by date, author, etc.) by activating sorting buttons 330 above such entries.

At this point, the user can use any one of a number of different commands to perform operations with the messages 325 listed with an entry in area 320. First, the user can discard the retrieved messages. A new search query can be executed, simply by selecting another one of the filter parameters 317 in message query menu 316, and without ever leaving interface 310. Alternatively, a complex search query might be executed by selecting more than one query filter parameter 317, so that only entries satisfying both criteria (i.e., two overlapping logical groups of messages) are retrieved by community search robot 231. While this is more slow (because it involves more effort on the part of search robots on the server to coordinate two searches) and may reduce usability, it can be included if desired for limited circumstances.

As another alternative, the user can activate a button on the mouse (or other pointing device) when the cursor has selected an entry 325, and this then provides an additional menu of options. In particular, the user can perform any of the following operations at this point:

Search this Group: this has the effect of making a text entry dialog box appear, and the code associated with the interface will search for and display those messages from the retrieved group which include that text.

Show Author's Messages: this has the effect of displaying within display area 320 only those messages from the retrieved group that were posted by the author of the selected message Add Message: see below; this lets a user add a message Edit Message: permits an author, in some cases, to alter the contents of an original message Highlight Author: this has the effect of permanently marking the author of the selected message as a favorite of the user; thereafter, postings from this chosen author are shown in bold type in the group detail area 320

Unhighlight Author: removes the author of the selected message as a favorite of the user Ignore Author: permanently designates the author of the selected message as someone whose postings should be ignored; thereafter, messages from this author are still retrieved and displayed in group detail area 320, but such messages show up with an italicized designation "Ignored"

Unignore Author: removes the author's designation as someone to be ignored Add to Favorites: adds the currently selected group to a new query parameter that can be immediately accessed under the "Custom" subject matter area control button 312

Remove from Favorites: removes the currently selected group from the Custom query parameter menu View Related Trades: when the present invention is used with an intelligent trading program that also allows individual trades to be coded with classifications matching the query parameters (i.e., if a trade is indicated to have a Reason, Lesson, or Symbol), then activating this key opens a new window for the user to see any and all of his/her trades that have a coding matching the query parameter used by the user for the present query View Author's Trades: as above, except it uses the author in question Chart this Symbol: this option is available only when the "Stocks" groups is chosen; this links to another window where another application program, such as Prophet-Charts sold by the present assignee, generates a chart for the stock in question;

Find Author in Chat Room: Chat rooms are commonly used in message board based communities, and are preferred by many subscribers since it permits direct communication. Often, however, because of the number and logical partitioning of such chat rooms, it is difficult to locate a particular person of interest to the subscriber, even if that person is currently logged into a specific chat room. By allowing the user to know where the author is, and to be instantly transported to such chat room (if the author is in a chat room), the present invention greatly facilitates and enhances community interactions and bondings between subscribers. When the author is not already in a chat room, this feature can still be activated to send an alert to the user if and when such author does actually enter into a chat room in the future.

These are merely illustrative of the various kinds of useful operations that can be performed with these entries, and other examples will be apparent from the present teachings.

Assuming instead the user wishes to examine the substance of any of the retrieved messages, this is done simply by selecting one of the entries 325 through the use of a mouse, cursor, etc. At that time, a third display area 340, which can be thought of as a "message detail" area, provides a visible image of the substance or content of the selected message. As with prior art systems, the user can use various control buttons 355 to effectuate common operations, such as looking at the previous or next message, replying, searching for text, etc. A significant distinction, however, lies in the fact that in the present invention, the contents of the message are simultaneously visible with the listings of the retrieved messages. This means that, at any moment, the user has access and can easily perceive and/or manipulate all levels of his/her query, from the broadest subject matter delineation (subject matter area control button 312), to the next level classification/subclassification (query filter parameter 317), to the final level of retrieved messages (entries 325).

An additional subject matter area control button 312 labelled "Custom" includes a menu of control options reserved for customizing the interface to the user's particular needs and tastes. This menu, shown in FIG. 3c, can provide a variety of additional functionality. For example, it provides an additional list of filtering options that are used as a logical screen or overlay over other search and query operations performed under other subject matter areas 312. For instance, as noted earlier, a user might elect to always ignore postings by a particular author, regardless of their relevance to a particular query made under a particular subject area. These postings, then, can be made to never appear to the user in message listing rare 320, even if they otherwise match the search logic used by the user for a particular search operation. Alternatively, they can still be retrieved by marked with some indicia as noted earlier. Similarly, the user might compile a list of his/her favorite authors, and by selecting this entry in the menu area 315, all of this person's entries might be displayed in message listing area 320.

Other more complex searching features or intelligent content groupings can be implemented by providing a limited number of dedicated, customizable search robots 232 on server 220 to each member of the community. These dedicated search robots 232, unlike community robots 231 that create the shared collections of message postings identified under general subject matter headings, serve particular users individually, and coordinate with database management system 240 to create customized collections of data of interest to the particular user based on regular polling and reviewing of data records 271. As one way of controlling the creation and use of customizable search robots 232 so that they do not overload server 220, individual users can be charged for exceeding a pre-defined number of customized filtering options. Other functions and variations for the "customize" feature will be apparent to those skilled in the art.

Figure 3C:
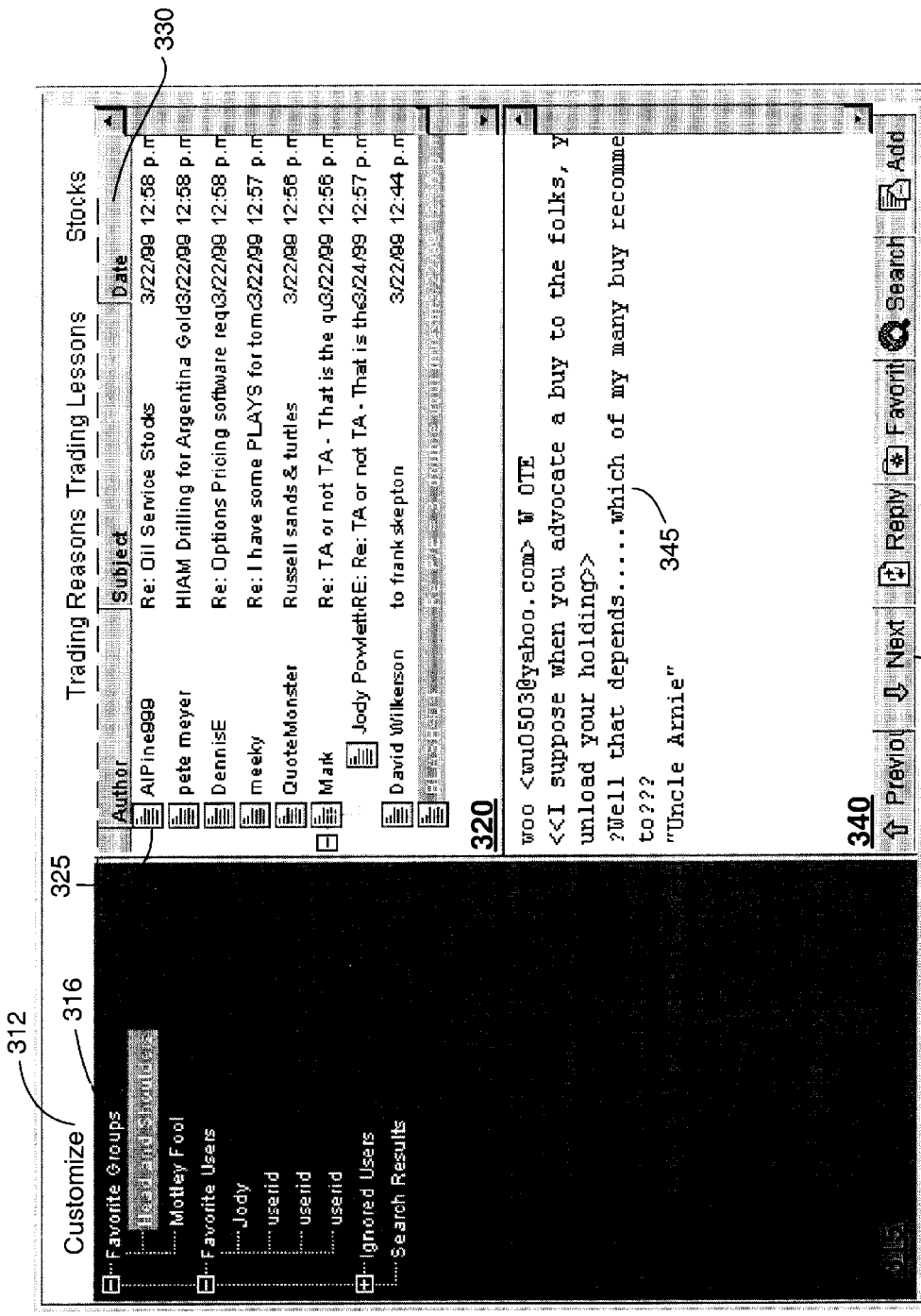
FIG. 3c is a visual depiction of the control options presented to a user when selecting an optional customization feature for the interface shown in FIG. 3b.
Figure 3D:
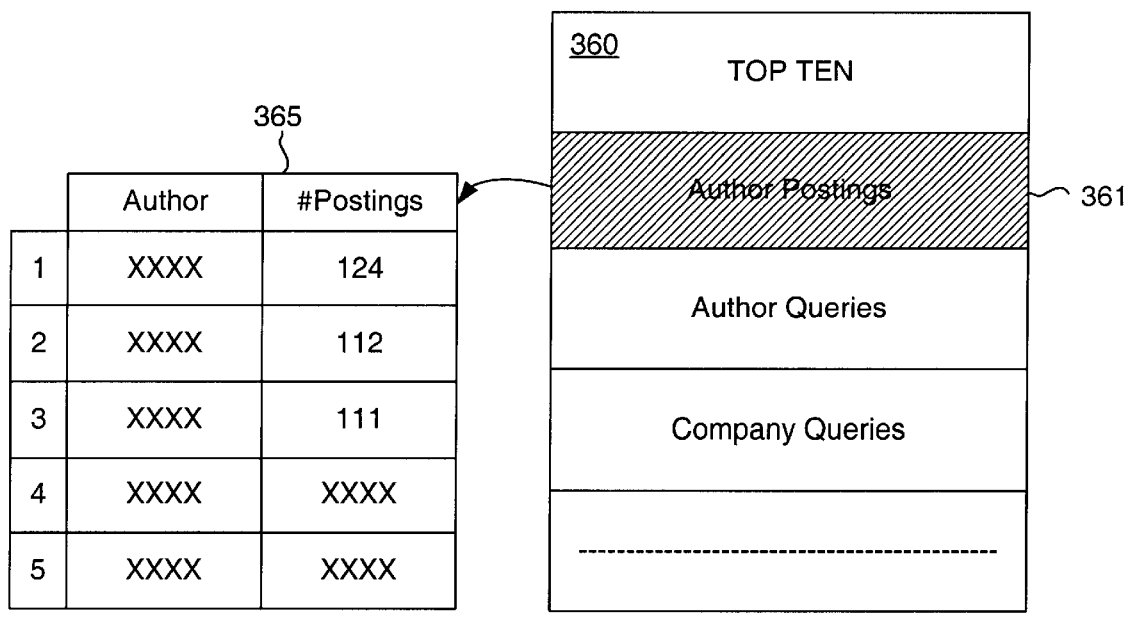
FIG. 3d is a visual depiction of the format of an optional message tabulating feature that can be used with the message board interface of the present invention.

As a further optional add-on feature, the user can also activate a tabulation window area 360 as seen in FIG. 3D, which can be adjusted to appear either as part of, or separately from the other display areas noted above. This feature is provided as additional general interest statistical information for the members of the electronic community sharing the message board system. For example, a "Top 10" list of most frequent posters can be compiled, to inform the members of active participants in the community. Alternatively, an entry 361 corresponding to the top most followed companies, the most read (popular) authors, etc., can be selected instead. After selecting a particular entry 361, the user is then presented with an additional pop-up window 365 providing more detailed information, including a ranking identifying the online name of the most prolific authors, the number of postings they have made, the date of the most recent posting, etc. For additional user benefit, an optional linking feature can also be implemented so that, upon viewing such rankings in window 365, the user can then automatically click and see the set of postings for such author/company, etc. in message listing area 320, and peruse them in the normal fashion described above. As noted earlier above, an additional "take me to the author's chat room" option can be implemented at this level, as well, so that further interaction can be immediately provided with popular authors on the system.

Instead of occupying another window, these same "Top 10=1 "—type links might instead be suitably located under yet another subject matter are control button 312 (such as the "Custom" button discussed above) so that they could be pulled up in the same fashion as the listings described above for "Trading Reasons" and the other groupings described above for ease of reference. The variations of course will be a function of the particular subject matter addressed by the message board system. The information presented in tabulation window area 360 and detailed tabulation window area 361 can be gleaned as part of normal administrative overhead operations of database management routine 230.

The inventive interface 310 thus provides a single integrated interactive window for searching, perusing and posting messages to an online message board system. The user is provided with both community based and customized sets of search parameters under broad subject matter headers 312. Additional narrowing filter parameters are then provided in an expandable tree-format to avoid prior art cumbersome, sequential multiple-page formats, which tend to confuse and slow down interaction between the user and the service provider. This reduction in demands on the user's attention and time results in greater ease of use and enjoyment of the interactive session with an online provider maintaining the message board system.

The display areas and functionality shown in FIGS. 3b, 3c and 3d are generated using well-known programming techniques, and the specifics of the same are not material to the present invention except as described herein. Nonetheless, a listing of the important source code routines used in the present invention is appended to the end of the present disclosure as Appendix A. Also, for purposes of the present invention a detailed description of those features commonly found and understood in application windowing technology (i.e., such as sizing, scrolling, handling and the like) is not provided. Such features can be implemented in any one of many techniques known in the art, and the invention is not limited in any way by such specific implementations.

Operation of Content Collection and Posting System

Figure 4:
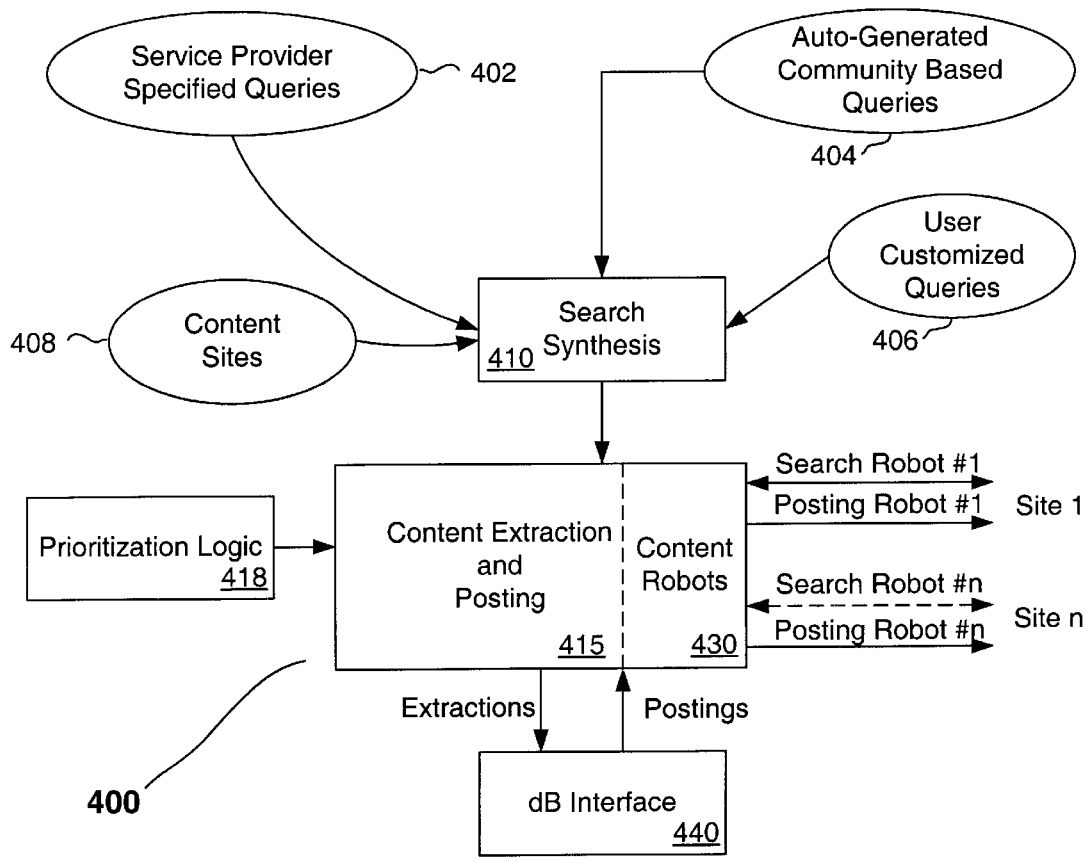
FIG. 4 is a simplified diagram detailing the basic components of a preferred embodiment of a content collection and posting system of the present invention as it would be implemented using certain software extraction/posting robots running on a server associated with an online data service provider.

FIG. 4 is a simplified diagram detailing the basic components of a preferred embodiment of a content collection and posting system 400 of the present invention. As noted earlier, this system is implemented on conventional network server associated with an online data service provider. Note that where applicable, like reference numerals in FIG. 4 are intended to refer to like structures and features of the present invention as presented in FIG. 2.

One of the main advantages of the present content collection/posting system is that it can be intelligently programmed to carry out message/data extraction from other online newsgroups, such as UseNet. The system can take into account a number of desired extraction parameters, including but not limited to service provider specified queries 402; auto generated community based queries 404; user customized queries 406; and content site information 408. Service provider specified queries 402 correspond generally to data filters conceived, authored, and/or formulated manually by operators associated with the service provider. These data filters can be based on the specific subject matter of the message board system, so that, for example, a data filter for a financial community is set up to look for discussions of a particular stock. Similarly, a medical community of online users might specify that materials associated with medical developments in a specific field (e.g. diabetes treatments) should be extracted. Additional data filters for additional subjects of course can be manually set up in the same fashion. As the service provider typically has some expertise in the particular area, this allows for customized data building that will likely be of interest to prospective subscribers. The service provider specified queries 402 can be set to execute periodically (i.e., daily) to update system 400 with new data using well known conventional scheduling logic.

Supplementing the service provider specified queries 402 are auto-generated community based queries 404. These data extraction filters are generated as a result of monitoring subscriber query and subscriber postings made to database system 240. In other words, as each query/message is handled by system 200, it is broken down and analyzed for keywords, which are then tabulated. Based on such tabulation, a service provider can quickly identify new subject matter of general interest to the particular online community. For instance, ongoing events may trigger a sudden interest in a new topic, such as in the case of an financial community, a previously unlisted company might become the center of attention because of news stories read by the subscribers. When this happens, the company of interest is likely to be identified several times, both in postings and in queries, by the subscribers to system 200. By extracting and tabulating keywords in such posting and queries, a numerical ranking or index can be built of subjects that are apparently of current interest to the community; thus, the particular company is one of the more highly mentioned data items, it will appear higher in the numerical ranking/index. Similar examples will be apparent for other fields of interest, such as medicine, health, collecting, art, education, computers, movies, literature, sports, science, etc. This numerical index can be used on a daily basis by the service provider to automatically extract information of interest to the online community in one of two manners: (1) by serving as a recommended "hot topic" list that can be manually scanned by an operator, and be used to manually formulate a new service provider specified query 402; and/or (2) by serving as an input to an automatic data filter generator, so that auto generated community based query 404 is created. In either case, the new query can be added to the set of data filters to be used for extracting content of interest from various online content sites. The status of the user, including whether such user is paying for subscribership or not, can also be factored into the consideration to ensure that preferred subscribers are given an appropriately weighted voice in the decisions affecting the online community.

It can be seen that the system of the present invention is self-tuning, or auto-configuring, in the sense that it intelligently monitors "feedback"—interests of its subscribers—and uses this information to dynamically build new content of the same nature. In this way, it is expected that the present invention will enhance the "stickiness" of a particular web based service provider, by which it is generally meant that the service is more likely to retain its subscriber base, and keep such subscribers actively engaged when they are visiting such site. Since this factor is of prime importance to advertisers (i.e., it increases the chances that their ads will be seen) it is further expected that this will increase the appeal of message board systems that include the enhancements of the present invention. This means also that message board systems utilizing the present invention should continuously become more popular with its members, since it constantly (dynamically) tries to improve content, organization, etc. in response to its user's desires, and in accordance with their demonstrated level of interest (i.e., their status).

In addition to the above data filters, additional data filters for data mining or extraction can be based on user customized queries 406. In other words, as part of the service provided by an online message board system, a certain amount of resource overhead can be allocated to assisting users to locate customized/individualize content beyond that already collected by the community based content filters noted above. This again further enhances and increases the appeal of the present invention, since users can be given some capability for creating their own content libraries for later perusal, again, in a degree appropriate for their respective status.

Finally, information regarding useful/available content sites 408 (e.g. UseNet) can also be accounted for, based on access arrangements reached with such entities. These sites then serve as the raw source material for the data items stored in the present system. In some instances it may be possible to have such raw data already logically arranged in a manner that is congruent with the data architecture of the present invention. In other words, through suitable cooperation between the service provider and the content site, a content site 408 can arrange its data such that it matches the groupings on server 220 and therefore reduces computational overhead on the latter. While this is not necessary, it can be a useful enhancement to the operation of the present invention.

These are but examples, of course, and other extraction parameters will be apparent to one of ordinary skill from the teachings herein. With the aforementioned data extraction parameters in hand, a search synthesis routine 410, implemented with conventional programming logic suitable for execution on server 220, then builds a series of data filters that are then passed on to a content extraction and posting routine 415. This content extraction and posting routine 415 can also be implemented with well-known techniques to process the data filters in accordance with prioritization information from prioritization routine 418. Generally speaking, prioritization routine 418 can be programmed in any well known manner to accommodate a priority specification desired by the service provider. For example, the service provider may specify that service provider specified queries 402 should be executed prior to auto-generated community based queries 404 (or vice versa). An identification of the order of which content sites to be mined can also be specified for example. Other prioritization specification data and schemes can be easily accommodated in a similar manner and can be implemented using conventional programming logic. While prioritization routine 418 is shown separately from search synthesis routine 410 for illustrative purposes, it is understood, of course, that the two might be integrated in some applications, or that the former routine might be included within other software modules associated with the content/posting system of the present invention.

Content extraction and posting routine 415 interacts with a series of software search robots 430. For a particular content site #1, one or more search robots extract and post content (messages, news postings, image data, audio data, etc.) in accordance with the sequence and logic specified in the data filters passed on by content extraction and posting routine 415. The raw content extracted by search robots 430 is passed on to database interface 440, where it is broken up and categorized as described briefly above, and in more detail below. The postings made by search robots 430 are also passed on by database interface 440 as explained further herein. As such software search robots are well-known in the art, they are not described in detail herein.

Figure 5:
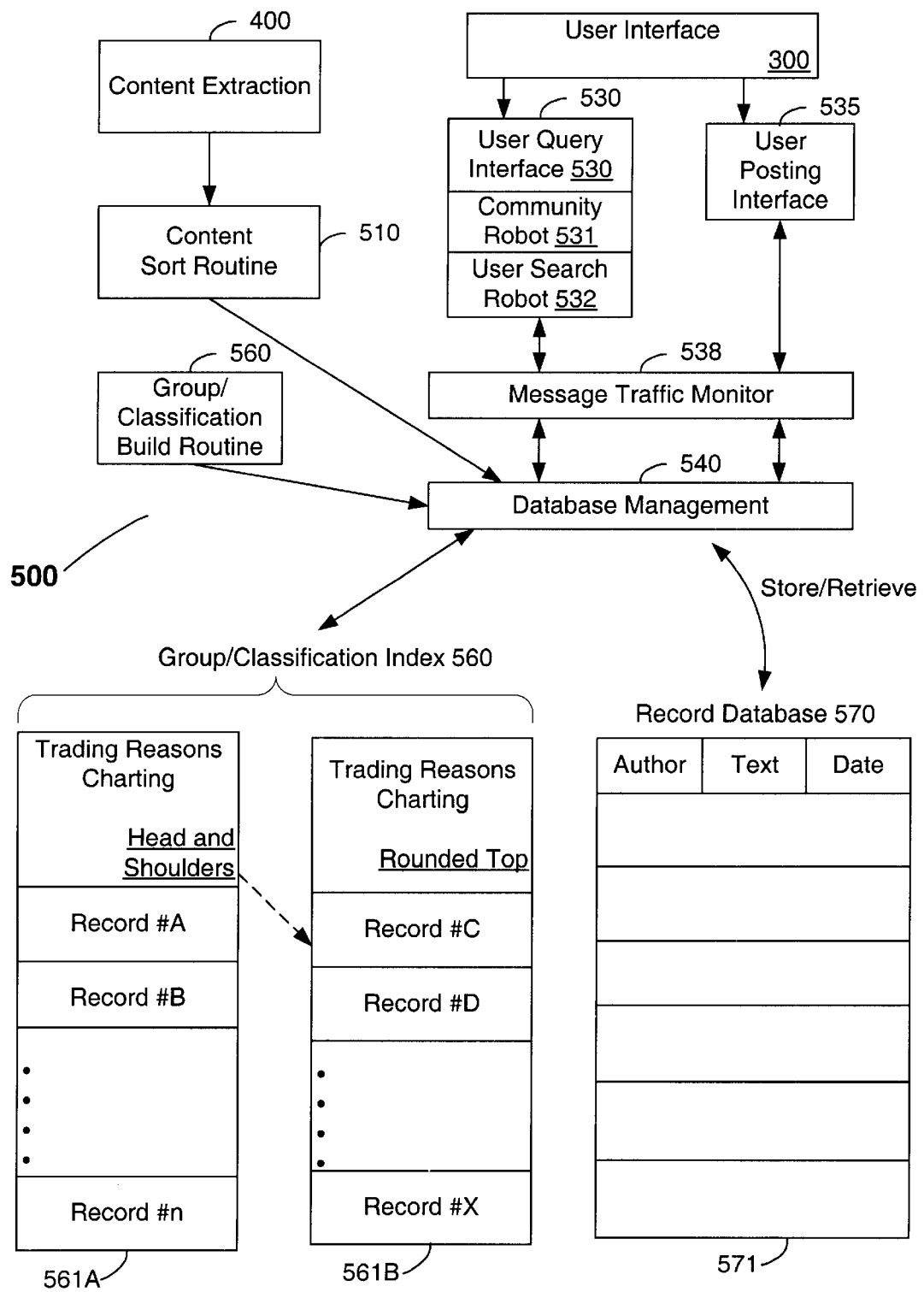
FIG. 5 is a simplified diagram detailing the basic components of a preferred embodiment of message indexing/retrieval system of the present invention as it would be implemented by a database management routine running on a server associated with an online data service provider.

Thus, the content extraction and posting system 400 of the present invention allows for an online message board system to create an initial content base of interest to prospective subscribers, and to dynamically update or tune this content base so as to reflect the current interests of its ongoing subscribers. While the functions and features described above are unique to the present invention, it is expected that the software routines embodying the same can be implemented by those skilled in the art in accordance with the present teachings using a variety of conventional programming techniques, and the present invention is by no means limited to any particular hardware/software implementation. Operation of Message Storage/Indexing/Retrieval System FIG. 5 is a simplified diagram detailing the basic components of a preferred embodiment of message indexing/retrieval system 500 of the present invention that coordinates with the content extraction and posting system 400 and user message board interface 300 discussed above. Note that where applicable, like reference numerals in FIG. 5 are intended to refer to like structures and features of the present invention as presented in FIGS. 2 and 4.

The first component of message indexing/retrieval system 500 is a content sort routine 510 that receives, processes and sorts raw content from content extraction system 400. The sorting logic used, of course, will vary from application to application, but can be specified by the service provider using a group/classification build routine 560. For example, as noted above, content is processed to extract information that can be classified under the general subject matter grouping label "Trading Reasons." Further sub-classifications are based on content that relates to a discussion of "Head and Shoulders" for example, as see in FIG. 3B. These groupings and sub-classifications, which serve as the backbone for later user query/postings, can be set up in advance by the service provider, or, alternatively, can be constructed automatically by a group/classification build routine 560. In the latter case, the groupings and sub-classifications are generated again based on monitoring user queries and postings, so that new data clusters of interest to the community are not only extracted, but also structured and arranged logically on server 220 so that they can be easily accessed by subscribers. Notably, the sorting logic contained in routine 510 can be the same, or different from that used by content extraction and posting routine 415. In some instances it may be preferable, for example, to use relatively broad data filters for content extraction and posting routine 415, and then have the raw content broken down later into finer classifications within server 220.

The raw content, therefore, is then logically stored by database management routine 540 to a conventional database 570 consisting of several data records 571. In the case of a pure text message based system, for example, each such record will include such information as the message author, message text, and message data. Other fields, such as message subject, and message classification data (grouping, index, etc.) can also be stored depending on the application, along with other multimedia information as desired (audio, video information, preferably in compressed format).

In accordance with grouping/classification parameters specified by routine 560, a series of individual group indexes 560 are constructed by database management routine 540 as well. Group indexes 560 correspond, generally to the subject matter labels presented to the user in interface 300 (FIG. 3b) under the subject matter header buttons 312. In FIG. 5, under group indexes 560 are sub-classification indexes 561*a*, 561*b*, etc., corresponding generally to one for each of the parameters displayed in detailed group/message subject matter menu 316 (FIG. 3). Thus, for example, in FIG. 5, a list of messages 561*a* is constructed and maintained, falling under the three level classification category "Trading Reasons"—"Charting"—"Head and Shoulders," which category also appears as a query parameter 317 (FIG. 3b) to the user. The same data subclassification/index structure is generated and maintained by database management routine 540 (FIG. 5) for the "Trading Reasons"—"Charting"—"Rounded Top" query parameter 317 shown in FIG. 3b, and for every other query parameter that can be accessed by the user using interface 310. The advantage of indexing the data in this fashion, is that it can be easily and quickly located by database management routine in response to a user query. Thus, individual records A, B, C, D, etc., can be rapidly located and retrieved, giving the user extraordinarily fast access to data that has been classified in accordance with community based interests and guidelines.

The other components of message retrieval/indexing system 500 include a user query interface routine 530, and a user posting interface routine 535. These routines are generally responsible for interacting through the data link to field queries and postings channeled through user interface 300 (FIG. 3b) running on the user's computing system. All queries, commands and postings from the user are translated into a form suitable for handling by database management routine 540. For the most part, these routines can be implemented in any well-known manner to coordinate with queries, commands and message postings sent by the user, and to return relevant data records from the database management routine 540 in response to such queries and commands. In a preferred embodiment, as noted earlier, a series of community search robots 531 and customizable search robots 532 are used to coordinate between the user and database management routine 540 as discussed above in connection with FIG. 3b. While these search robots are shown as part of user query interface 530, it is apparent that they can be implemented in many different variations that are either separate and/or integrated with database management routine 540 to effectuate the operations discussed above in connection with FIGS. 3a to 3d.

In one especially useful variation, to improve response time from the user's perspective, his/her customized message categories (i.e., for a particular group, class, subclass or author that have been identified under the "Custom" subject matter header) can be downloaded immediately by the user query interface 530 at the beginning (or intermittently during quiet periods) of an interactive session. Preferably, this data is transmitted in compressed form, and uncompressed at the user's site, where are there are more dedicated resources for such task, and so that the pre-loading does not interfere with normal operations. Since these customized areas represent subjects of most interest to the user (since they are already designated as favorites), it is more likely that these are to be queried during any session, so it is advantageous to have them in hand quickly. Again, this improves the user's experience with the message board system, and increases the likelihood that they will remain with the service provider.

Similarly, instead of relying purely on the individual's prior designations of "favorite" areas, the system may instead base decisions for pre-loading of messages on community wide derived statistical data of popularity of subject categories, which can be collected in the manner described above. Thus, the system can, at all times, be dynamically constructing and maintaining sets of compressed files representing collections of community wide favorite subject matter/class message data items. These collections may represent, for example, individual files representing the top 10, 20 or 50 subject/class areas most commonly queried areas. In this manner the composition of the files is based primarily on a democratic process that reflects community wide preferences. During a session, therefore, the system may send a single file, in advance, containing the entirety of messages for the top 10 subject/class areas. For another user with a faster link, more memory, etc., a larger file might be sent instead, with the top 20 subject/class areas, so that the pre-loading is tailored to the specifics of the user's operating environment. In similar fashion, in some embodiments it may be desirable to implement a variation whereby when a user makes a query for a particular subject/class of message entries, the system again predictively decides that the user is likely to ask for the content of other related subject/class areas that are either logically related, or contained within a file having the same level of popularity (i.e. the queried subject/class is within one of the pre-loadable files, so the other subject/class messages in such file are also transmitted).

This approach has the advantage of anticipating the likely possibility that the user will eventually, during some portion of the session, also wish to query such subject matter areas. Thus, to some extent, the system can speculate and/or predict the user's behavior (based on commonly observed characteristics of the users of the system) and then cache these message entries locally in compressed form. If these materials are easily loadable within the interface (because decompression on the user's end is typically a fast process compared to a transmission process for the same size file) the user experiences a significantly reduced response time from the normal, linear, query—search—return process described earlier, and which is prevalent in prior art message board systems.

This reduction in query related traffic from the user's side also translates into a number of additional performance gains. In particular, the data link bandwidth is more efficiently used. For example, the link bandwidth can now be used for other purposes during the session (such as for generating other user queries, receiving user postings, transmitting advertising materials to the user interface, etc.).

More importantly, by off-loading most of the "processing" off the message server, the efficiency of the message board system can be improved as well. In other words, the number of actual query transactions on the server 220 can be minimized, because the user's data (and other popularly retrieved data) is pre-cached, pre-compressed, and downloaded to his/her local machine where it can be handled far faster, and without delays caused by other user transactions. Thus, the data is strategically located to areas where there are more computing resources to process it according to the user's requirements.

The final component of message retrieval/indexing system 500 is message traffic monitor routine 538. This routine is generally configured to analyze user queries, commands, postings and interface settings (i.e., which groups/authors are listed as favorites of a user) to tabulate the information discussed above in connection with 3D, such as hot discussion areas, including the "Top 10" posters list noted above for example. In other words this routine monitors such information as what groups, classifications, sub-classifications, topics, authors, chat rooms, interface customizations, etc., are being accessed the most (or least); what users are posting the most entries, etc., and creates one or more tabulation databases 580–582 (FIG. 5b) that can be used for a number of useful purposes.

For example, whenever a user makes a query for a particular stock symbol X using one of the standard group/subclassification index search parameters, this can be used for incrementing a "hit" counter for such stock symbol X as it is registered in a group/classification tabulation database 581. Other group/classifications parameters can be similarly identified and tracked to create current hot topic lists. In those embodiments where the user is predictively given other subject/classification content along with his/her requested content, it is preferable to include additional tabulating logic at the local machine, so that the user's actual queries are monitored, and fed back to the message traffic monitor routine 538. In this manner, errors that might arise from falsely attributing "popularity" of subject matter (i.e., because it was downloaded to the user's interface) can be minimized, because only actual subject/class areas queried by the user are relied upon.

Similarly, the text of each user message posting can be broken down, and a record created in a database 582 for each keyword, along with a counter that is incremented for each usage of the keyword in other user messages. The same can be done with author information, so that queries made to messages belonging to particular authors can be tracked with a database 582, or that postings made by particular authors can be tracked in a database 583. Furthermore, interface customizations done by other users of the online system can be captured and catalogued in aggregate form, such as user designations of highlighted authors, designations of authors to be ignored, groups of messages added to "favorites" under the Custom control button, etc., can also be compiled and displayed for community perusal.

Finally, individual user "profile" records can be created and maintained by the system, so that a user's selections, preferences, frequency of selections of subject matter, etc., are tracked, and kept uniquely for each such user. This provides the system provider with additional useful survey information, as such profile can be correlated with standardized data to determine additional characteristics (income, assets, interests, education, etc.) of such user based on comparisons with other individuals having a similar profile. Furthermore, such profiles can also be tabulated and analyzed to determine community wide prevalence rates for certain types of subject matter selections, preferences, etc.

The benefits of tabulating this information are many, including the fact that:

(1) New group/subclassification indexes can be recommended to the service provider for inclusion in user interface 300 (FIG. 3) and/or automatically added to such user interface by studying what categories are popular with a particular community of users; conversely, unpopular categories of data can be eliminated or pruned to reduce clutter on the interface seen by the user. Thus, the system can learn the interests of its users, and build content classifications in accordance with such feedback.

(2) User interface 300 (FIG. 3) can be altered dynamically so that subject matter headers 312, or query parameters 317, can be re-arranged based on their popularity. In other words, the interface can be made to ergonomically self-tune itself so that more popular items appear earlier in the menu, or at shallower branches of the tree menu 316, minimizing the burden on the user to find subjects of interest.

(3) Extraction control by prioritization routine 418 (FIG. 4) can be tailored based on data in tabulation databases 580–583, so that, for example, content is retrieved by the search robots in proportion to the interest level of the community. This permits a message board system to learn the interests of its users, and then located and extract content in direct relation or proportion to such content's popularity within such community.

(4) New areas for content extraction can be gleaned from databases 580–583 and passed in the form of an auto-generated community based query 404 (FIG. 4) based on analysis of keyword extractions of user message postings. Again, by studying the messages posted by its own users, the system can learn to find information most likely to retain the interest of such subscribers. Thus, subscribers can be given more of the information they have already expressed a strong interest in.

(5) Statistics on user messages, queries, and customizations can be packaged for general community consumption as an automatically generated "hot item" list (see FIG. 3D). Thus, users can immediately be alerted to new topics, subjects, authors, useful interface customizations, etc., that are of current interest, further increasing the appeal of the system, since now users can learn and benefit from individual and aggregate behavior, interests of the community.

(6) As noted earlier, decisions on how to build fast, pre-compressed files of popular subject matter areas can also be easily determined from studying community wide interest, as expressed in queries, postings, etc. This results in users getting more of the information they want, and faster.

(7) Demographics information concerning the subscribers can be indirectly gleaned from observing their queries and responses as posted to the system. This information, too, can be used for determining appropriate advertisers, advertising, etc. For example, in a medical based community, if message traffic suggests a strong following and discourse in certain types of medications (say brand X), this permits the service provider to more accurately identify, select and target appropriate advertisers, ads, etc., tailored to such audience. Furthermore, even the initial selection and setup of subject areas, classes, sub-classes, etc., can be designed based on marketing research based criteria, so that the mere selection of a particular subject area/class combination by a subscriber can be correlated immediately with other typically associated/expected interests of such user, user demographics, user financial profiles, etc. This is less intrusive and more likely to result in accurate user profiling than conventional lengthy online surveys, where people are inclined to provide incomplete and/or inaccurate information because of privacy sensitivities. In other words, a particular user's selections of materials can be monitored and compared against reference data for a normalized group of individuals (i.e., from market or focus group research) to determine a probable education level, income, assets, and the like for such individual. This method is more accurate in collecting true user profile information, since it is constantly refined, updated and improved (based on user selections) and does not require explicit input from him/her that would cause them to be less forthcoming about their true profile characteristics. This, in turn provides a tool for service providers to construct a more accurate profile of his/her subscribers, so that content, ads, etc., can be more effectively managed and tailored to the community as a whole.

All of the above monitorings can consider the status of a subscriber, as well, in any tabulating calculations. For example, subscribers paying for a premium level of service can be weighted heavier than users who are using only minimal functionality of the system for free. Thus, again, the persons who are of most interest to the service provider can be afforded the greatest "vote" in determining prioritizations, content, and structure of the online message board system.

In a preferred embodiment message traffic monitor routine 538 is depicted as logically placed as an intermediary data buffer between user query interface 530, user posting interface 535, and database management system 540, so that tabulations of message keywords can be updated quickly and kept current. Nevertheless, it is entirely possible that the benefits of such routine can still be substantially enjoyed by setting up this routine to simply monitor access/storage operations performed by database management routine 540, and to compute message statistical data from processing pre-stored records 571 in database 570. The particular implementation will of course vary from environment to environment. Also, while not material to the present invention, an "inference" engine might also be used to deduce related classifications from keywords posted in user messages, so the entire process does not rely strictly on user-specified topics or keywords.

Figure 6:
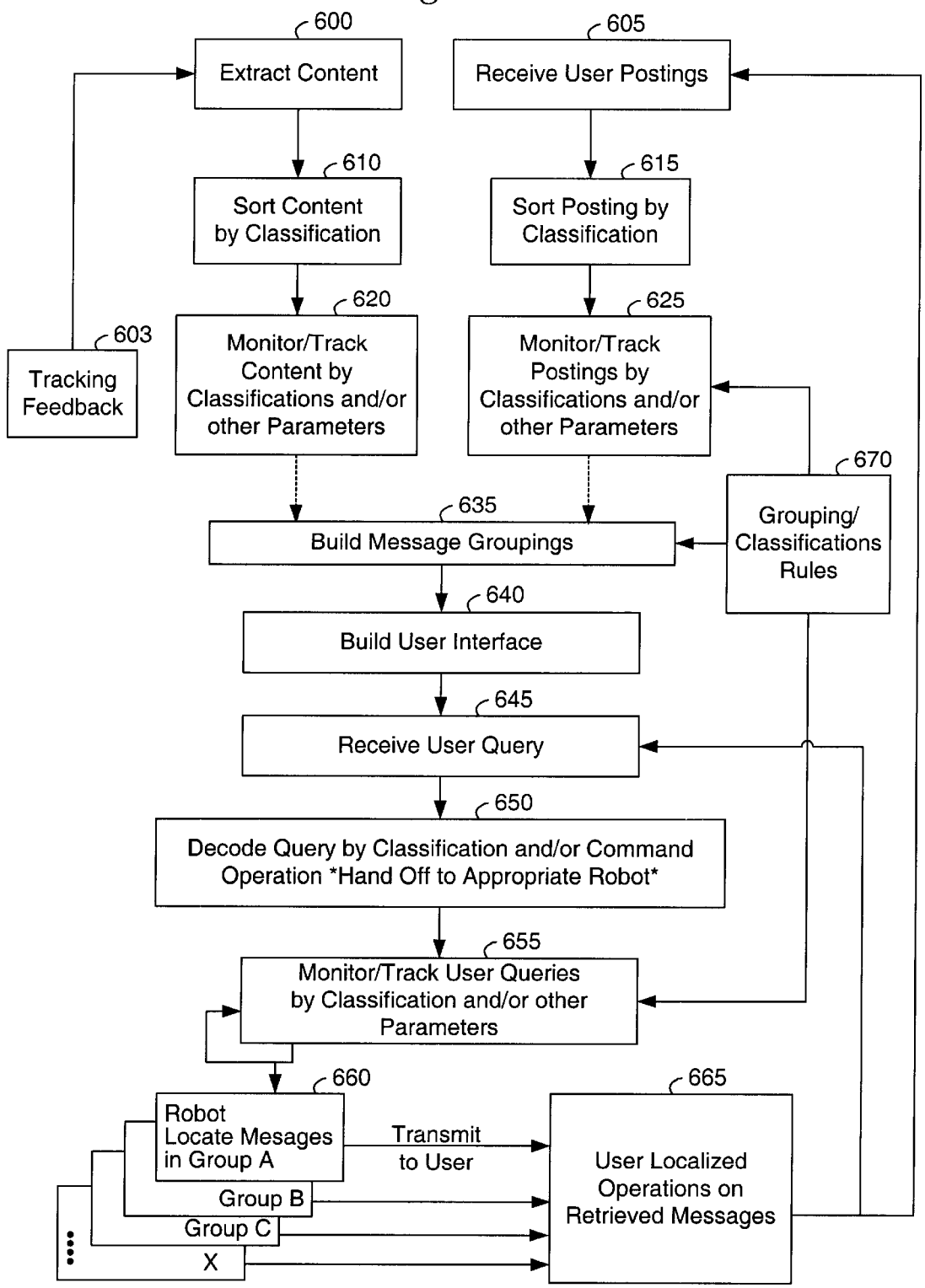
FIG. 6 is a flow chart detailing the general operation of a preferred embodiment of a content search system of the present invention as it would be implemented using certain community and custom search software robots running on a server associated with an online data service provider.

Operation of Content Search System, including Community and Customized Search Robots FIG. 6 is a flow chart detailing the general operation of the content extract/posting system 400 and message index/retrieval system 500 of the present invention. As described in detail above, raw data content is extracted at step 600 in accordance with data filters and prioritization logic specified by the online service provider, which can be considered as tracking feedback information 603. This content is then sorted based on group/subclassification logic at step 610. At this point, too, an additional monitoring routine 620 can be executed that is essentially identical to that already discussed above on the user query/posting side, except with a slightly different perspective. In this variation, the present invention can essentially learn by studying message data from other content sites, and discover if there are other potentially "hot" areas that might also be of interest to the community members. This message data from other content sites, therefore, can be tabulated and used in the same manner as discussed above in connection with databases 580–583.

At step 635, the processed content data is then built into appropriate message groupings/subclassifications for easy review and retrieval by users according to the query parameters found in the user interface 300 (FIG. 3*b*) as discussed above. These groupings/subclassifications also built based on received input data from user posting operations, which begin basically as illustrated at step 605. These posting are also sorted at step 615 and monitored at step 625 as described earlier to glean posting statistical information.

Therefore, when a user first interacts with message board system of the present invention, a user interface routine 640 at server 220 (FIG. 2) downloads the user's previously defined interface 300 (FIG. 3*b*), where it executes as a java based applet within the user's browser program. At this point, the user can execute a query at step 645 along the lines described above, using any one or more of the query parameters 317, or some other command (i.e., one of the operations specified in connection with entries 325). This query and/or command is transmitted upstream to the server, where it is decoded at step 650 by the user query interface, and, in the case of a query, handed off the appropriate community or customized search robot. These queries are also monitored at step 655 as described earlier to glean query tabulating information.

The search robots then retrieve the appropriate group/subclass messages in accordance with the user specified search criteria at step 660. They are then downloaded to the user's system where they are accessible to the user through the interface 300. At this point, at step 665, the user can perform any of the aforementioned operations discussed in connection with FIGS. 3*a*–3*d*, such as by posting a new message (in which case the process loops back to step 605), or by posting another query/command (in which case the process loops back to step 645). The message postings/queries are tracked in accordance with grouping/classification rules 670, which, as explained above, preferably should change dynamically based on subject areas of interest to the community members.

Again, the behavior and prioritization of searching/posting performed by community and customized search robots can be adjusted based on the status of a particular community member. In other words, members having a higher status on the online message board system (achieved through higher subscription fees or usage for example) can be afforded faster treatment, or have their queries/postings handled before lower status members. Again, in this manner, members of the community can be treated in accordance with a level of demonstrated interest and seriousness in the affairs of the community as a whole, thus increasing the chances that such members will be retained by such service provider.

As alluded to above, to improve response times as perceived by the user, and to alleviate link congestion during a session, pre-loading of all the user's customized search categories, or some number of most popular categories can be done at step 640, so that they are immediately made available for inspection within the user's interface. This approach can be used for a number of areas (subject to memory constraints within the user's computing system) so that the experience of interacting with the message board system is also enhanced by the expediency in which the user's queries are apparently handled. Other variations of this functionality will be apparent to those skilled in the art from the present teachings.

While the present invention has been described in terms of a preferred embodiment, it will be apparent to those skilled in the art that many alterations and modifications may be made to such embodiments without departing from the teachings of the present invention. For example, it is apparent that the present invention would be beneficial used in any environment where it is useful to collect, classify, and analyze voluminous numbers of electronic messages. Other implementations for the interface beyond those illustrated in the foregoing detailed description can be used suitably with the present invention. Accordingly, it is intended that the all such alterations and modifications be included within the scope and spirit of the invention as defined by the following claims.

What is claimed is:

1. A tracking system for monitoring and analyzing message traffic on an online message board system used by a number of subscribers, said system comprising:

a set of message data items stored based on a classification scheme having a plurality of groups and classes;

a query processing program for processing a subscriber query to locate selected message data items of interest to the subscriber, said query being coded so that each such subscriber query can also be classified by said query processing program based on said classification scheme and/or other identifying parameters for said query; and a posting program adapted to receive and store subscriber message data items, at least some of said subscriber message data items being coded so that such subscriber message data items can also be classified based on said classification scheme and/or other identifying parameters for said subscriber message data item; and wherein said coding characteristics and/or said identifying parameters of said subscriber queries and subscriber message data are tabulated, and selected portions are made available in tabulated form for inspection by the subscribers.

2. The system of claim 1, wherein at least some of said subscriber message data items are coded based on a coding of a selected message located by said query processing program.

3. The system of claim 1, wherein said subscriber queries are coded to have a coding based on a set of query filter parameters selected by a subscriber, and which query filter parameters are logically associated with said classification scheme.

4. The system of claim 1, wherein said tabulated form includes a ranking of coding characteristics pertaining to: (1) groups and/or classes most often queried; and (2) groups and/or classes most often posted to.

5. The system of claim 1, wherein said tabulated form includes a ranking of identifying parameters pertaining to: (1) authors most often queried; and (2) postings made by authors.

6. The system of claim 1, wherein said tabulated form includes a ranking of identifying parameters pertaining to subscriber query formulation preferences compiled for all of said users of said system.

7. The system of claim 1, wherein said tabulated form includes user profile information, including information identifying parameters previously used in queries for each of said users of said system.

8. The system of claim 1, wherein said classification scheme is automatically modified on a periodic basis in response to tabulations of said coding characteristics and/or said identifying parameters of said subscriber queries.

9. The system of claim 1, wherein message data items are sent automatically to said subscriber during a session based on filter selection items previously customized by said subscriber during a prior session, and without requiring additional prompting by said user.

10. The system of claim 7, wherein said codes for said subscriber message and subscriber queries are also changed in accordance with any modifications to said classification scheme.

11. A content building system operating on an online network server for building a database of information items accessible by a number of online subscribers, said system comprising:

a content extraction program adapted for locating and extracting selected information from one or more remote online network servers, which selected information matches a search criterion;

wherein said search criterion is specified by an operator of said online network server;

a sorting program configured for sorting said selected information and subscriber messages in accordance with a classification scheme so as to create a plurality of data files of sorted information items, each of said sorted information items being coded to fall within one or more categories of said classification scheme; and wherein said classification scheme is specified by an operator of said online network server;

wherein information items can be located and reviewed by subscribers through subscriber queries performed in accordance with subscriber selected query parameters logically related to said one or more categories of said classification scheme.

12. The system of claim 11, further including: a posting program adapted to receive subscriber messages, at least some of said subscriber messages being coded so that such subscriber messages can be classified in accordance with said classification scheme.

13. The system of claim 12 further including a database management program for integrating and storing said selected information and said subscriber messages.

14. The system of claim 11, wherein said selected information is obtained from online message board systems located on said one or more online network servers.

15. The system of claim 11, wherein portions of said search criterion are automatically generated by a message tracking program based on an analysis of said subscriber queries.

16. The system of claim 11 wherein portions of said classification scheme are automatically generated by a message tracking program based on an analysis of said subscriber queries.

17. The system of claim 11, wherein said selected information is obtained based on a priority schedule correlated with a frequency of occurrence of subject categories used in said subscriber messages and/or subscriber queries, so that information for subject categories occurring more frequently is retrieved at a higher priority than information for subject categories occurring less frequently.

18. The system of claim 11, wherein said system automatically builds content in proportion to subscriber popularity of such content, such that information for any particular type of content is retrieved at a rate proportional to such subscriber popularity.

19. The system of claim 11, wherein said content extraction program also locates and extracts selected information from one or more online network servers in response to specific subscriber requests using customized search robots associated with said specific subscriber requests, such that customized classification schemes for content are generated for said specific subscriber requests.

20. The system of claim 11, wherein at least some portions of said classification scheme are derived by the system automatically from analyzing said selected information located and extracted from said one or more remote online network servers.

21. A method of handling message item postings and queries made to an electronic message board system, the method comprising the steps of:

(a) storing message items so that they are searchable by users accessing the message board system based on a plurality of predefined information categories;

(b) configuring a user interface for said users when such users access the message board system such that said plurality of predefined information categories are set up as filter selection items within said interface;

(c) receiving a user query received from said user interface based on at least one of said filter selection items;

(d) locating a set of electronic message items on the message board system corresponding to said user query;

(e) transmitting such set of electronic message items to said user so that they can be perceived simultaneously with said filter selection items within said interface by said user;

(f) processing a user command associated with one or more of said electronic message items taken from said set of electronic message items, which user command is used to locate an author of said message items and/or additional message items originating from said author.

22. The method of claim 21, wherein during step (b) said filter selection items are configured to also include user customized filtering options for said message items.

23. The method of claim 22, wherein during step (c) said user query is based on one or more of said user customized filtering options.

24. The method of claim 21, wherein any and all of said electronic message items can be located using only one level of query windows within said user interface.

25. The method of claim 21, further including a step: processing a user posting, which user posting contains a user electronic message item that is processed based on one or more of said filter selection items associated with said user posting.

26. The method of claim 25, further including a step (g): storing said user electronic message item in one or more of said plurality of predefined information categories based on said filter selection items associated with said user posting.

27. The method of claim 25, further including a step (h): tabulating said filter selection items associated with said user posting to generate statistical information concerning said predefined information categories.

28. The method of claim 27, further including a step (i): processing a user command associated with one or more of said electronic message items taken from said set of electronic message items, which user command results in said statistical information being transmitted and perceived within said interface by said user.

29. The method of claim 21, further including a step (f): processing a user command associated with one or more of said electronic message items taken from said set of electronic message items, which user command results in a second set of electronic message items being perceived within said interface by said user.

30. The method of claim 21, wherein said set of electronic message items are sent to said user automatically during a session based on a set of filter selection items previously selected by said user during a prior session, and without requiring additional prompting by said user.

31. A method of managing message items on an electronic message board system, the method comprising the steps of:
   (a) classifying first message items using a first set of predefined information categories, which first set of predefined information categories are searchable by users accessing the message board system;
   (b) configuring a user interface for said users when they access the message board system such that said first set of predefined information categories are set up as a first set of filter selection items within said interface;
   (d) further configuring for a user, on a user by user basis, said user interface to include a second set of filter selection items within said interface based on preferences of said user;
   (e) receiving a user query received from said user interface based on at least one of said first and/or second sets of filter selection items;
   (f) locating a set of electronic message items on the message board system corresponding to said user query;
   (g) transmitting such set of electronic message items to said user;
   wherein said user interface, including a visual arrangement of said first set of filter selection items and/or said second filter selection items is automatically configured for said user based on a frequency of usage by said users of said first set of filter selection items.

32. The method of claim 31, wherein said second set of filter selection items constitute a subgroup selected by said user from said first set of filter selection items.

33. The method of claim 31, wherein said second set of filter selection items are associated with a customized set of categories selected by said user, and which second set of filter items do not include any of said first set of filter items such that said user can locate second message items using a second set of predefined information categories, which second message items are separate from said first message items.

34. The method of claim 31, further including a step (h): pre-loading said set of electronic message items in said interface to said user during a session automatically based on a set of filter selection items customized by said user during a prior session, and without requiring additional prompting by said user.

35. A method of monitoring and analyzing message traffic on an online message board system, said method comprising the steps of:
   (a) classifying message items based on a classification scheme having a plurality of groups and classes;
   (b) processing user queries received from users of the online message board system to locate selected message data items of interest to said users, said user queries being classified based on said classification scheme and/or other identifying parameter for said query; and
   (c) processing user posted message data items from said users, said user posted message data items also being classified based on said classification scheme and/or other identifying parameter; and
   (d) tabulating said user queries and user message data items to create message board system feedback information including at least: (1) an identification of classification schemes most commonly queried; (2) an identification of classification schemes most commonly posted to by users.

36. The method of claim 35, wherein said message board system feedback information is made available for access to said users.

37. The method of claim 35, wherein said classification scheme is derived in part from said message board system feedback information.

38. The method of claim 35, wherein said system feedback information also includes: (1) an identification of most frequently queried authors; (2) an identification of most frequently posting authors.

39. The method of claim 35, wherein said system feedback information also includes: (1) an identification of interface customizations most frequently used by the users of the online message board system.

40. A method of building message content for an online network server having a database of information items accessible by a number of online users, said method comprising the steps of:
   (a) locating and extracting selected information from one or more remote online network servers, which selected information matches a predetermined search criterion and is associated with one or more information categories of a classification scheme;
   (b) sorting both said selected information, as well as separate message items received from the online users, in accordance with said classification scheme so as to create a plurality of data files of sorted message items, each of said sorted message items being coded to fall within said one or more information categories of said classification scheme; and
   (c) locating message items for the online users based on user search queries associated with said one or more information categories of said classification scheme; and
   (d) analyzing said user message items and/or said user search queries, including content, authorship and codes associated with such user message items and user search queries;
   wherein said predetermined search criterion and said classification scheme are adjusted periodically based on the results of step (d).

41. The method of claim 40, wherein selected information for information categories occurring more frequently in user search queries is retrieved at a higher priority than information for information categories occurring less frequently.

42. The method of claim 40, further including a step (e): analyzing said selected information retrieved from said one or more remote online networks and recommending changes to said predetermined search criterion and said classification scheme based on such analysis.

43. An internet message board system associated with a community of online users and a plurality of information categories including one or more individual securities related categories, the system comprising:
   a first routine executing on a first computer associated with the system for receiving and processing electronic messages posted by the community of online users for inclusion in the one or more individual securities related categories;
   a second routine executing on said first computer for sorting and storing said electronic messages so that they are searchable by at least some of said community of online users according to the one or more individual securities related categories;
   a third routine also executing on said third computer associated with the system, said third routine interacting with the community of online users and being configured:
      (i) for receiving a first user query associated with the one or more individual securities related categories provided within a user query interface, said user query interface operating within a client computer system separate from said first computer; and
      wherein said first user query can include a category search request for all electronic messages relating to a particular security based on selecting a single predefined search parameter provided within the interface and/or an additional user specified option to be used for filtering electronic messages otherwise falling within said category search request;
      (ii) for locating a selected first set of electronic messages in response to said first user query; and
      (iii) for transmitting such first selected set of electronic messages to said user query routine interface; and
      (iv) for providing a visual chart of a securities trading price in response to a chart request provided within the user query routine interface for a chart related to a particular security;
      (v) for interacting with an author filtering tool provided within the user query routine interface so that electronic messages originating from a particular author can be selectively not displayed within said user query routine interface;
      (vi) for receiving a favorite status indicator from said user query routine interface specifying a particular author and/or a particular security as a favorite to be followed by the user of said user query routine interface;
      (vii) for processing a contact request from said user of the user query routine interface to contact an author of an electronic message.

44. The system of claim 43, wherein said third routine interacts with the community of online users to process said first user query, said chart request, and said contact request while allowing said user to remain within a single screen used within a portion of said user query routine interface.

45. The system of claim 43, wherein said chart request can be made during a time in which substantive content for one or more of said first selected set of electronic messages is visible within said user query routine interface.

46. The system of claim 43 wherein said first selected set of electronic messages includes an entire set of electronic messages relating to a particular security provided in response to any selected single predefined search parameter.

47. The system of claim 46 wherein if said additional user specified option is provided by the user, a filtered version of said first selected set of electronic messages is presented within said user query routine interface.

48. The system of claim 43, wherein said additional user specified option includes one or more of the following for filtering said first set of electronic messages: a text content criterion, an authorship criterion, a subject criterion, and/or a date criterion to be satisfied for generating a filtered subset of said first set of electronic messages to be displayed to said user.

49. The system of claim 43, wherein said third routine also is configured: (viii) for providing a list of actual trades made in connection with said particular security.

50. The system of claim 43, wherein said electronic messages posted by the community of online users can include non-text files including audio files, picture files and/or graphics files.

51. The system of claim 43, wherein a status of said user within the community of online users is considered by said third routine when interacting with said user to process said first user query.

52. The system of claim 51, wherein said status of said user is also considered by said first routine when processing said electronic messages.

53. The system of claim 52, wherein said status of said user is based on a usage level of said user within the community of online users, and/or a subscription fee associated with said user.

54. The system of claim 43, wherein said user query routine interface is implemented as a java based applet operating within a browser program operating on said client computer.

55. The system of claim 43, wherein said first computer includes one or more servers accessible through the Internet.

56. The system of claim 43, wherein a fourth routine monitors said first user query and/or any electronic messages posted by said user and determines profile information for said user to determine appropriate advertising materials to be communicated to said user.

57. The system of claim 43, wherein said contact request includes information identifying and/or requesting an identification of a chat room to be used for communicating with said author of said electronic message.

58. The system of claim 43, wherein said author filtering tool causes any messages originating from a particular author to be designated with a specified indicator within the user query routine interface.

59. The system of claim 43, wherein any electronic messages associated with a particular author and/or particular security identified with a favorite status indicator can be retrieved as a set using a single predefined search parameter provided within the user query routine interface.

60. The system of claim 43, wherein the system also provides tabulation data for review by the community of online users, including a listing of most popular authors of electronic messages, and/or most popular message boards for a particular security.

61. The system of claim 43, wherein individual preferences of each of the community of online users, including preferred authors and subject matter, are maintained by the system.

62. The system of claim 43, wherein the system provides tabulated information to said user identifying queries made by others of the community of online users, and a ranking of the same based on a frequency of occurrence.

63. An internet message board system associated with a community of online users and a plurality of information categories including one or more individual securities related categories, the system comprising:
- a first routine executing on a first computer associated with the system for receiving and processing electronic messages posted by the community of online users for inclusion in the one or more individual securities related categories;
- a second routine executing on said first computer for sorting and storing said electronic messages so that they are searchable by at least some of said community of online users according to the one or more individual securities related categories;
- a third routine also executing on said third computer associated with the system, said third routine interacting with the community of online users and being configured:
  - (i) for receiving a first user query associated with the one or more individual securities related categories provided within a user query interface, said user query interface operating within a client computer system separate from said first computer; and wherein said first user query can include a category search request for all electronic messages relating to a particular security based on selecting a single predefined search parameter provided within the interface and/or an additional user specified option to be used for filtering electronic messages otherwise falling within said category search request;
  - (ii) for locating a selected first set of electronic messages in response to said first user query; and
  - (iii) for transmitting such first selected set of electronic messages to said user query routine interface; and
  - (iv) for providing a visual time chart of a securities trading price in response to a chart request provided within the user query routine interface for a chart related to a particular security;
  - (v) for interacting with an author filtering tool provided within the user query routine interface so that electronic messages originating from a particular author can be selectively not displayed within said user query routine interface;
  - (vi) for receiving a favorite status indicator from said user query routine interface specifying a particular author and/or a particular security as a favorite to be followed by the user of said user query routine interface;
  - (vii) for transmitting a private message from said user of the user query routine interface to an author of an electronic message.

64. The system of claim 63, wherein said private message is not posted on the internet message board.

65. The system of claim 63 wherein said electronic messages posted by the community of online users can include non-text files including audio files, picture files and/or graphics files.

66. The system of claim 63, wherein any electronic messages associated with a particular author and/or particular security identified with a favorite status indicator can be retrieved as a set using a single predefined search parameter provided within the user query routine interface.

67. The system of claim 66, wherein the system also provides tabulation data for review by the community of online users, including a listing of most popular authors of electronic messages, and/or most popular message boards for a particular security.

68. The system of claim 66, wherein individual preferences of each of the community of online users, including preferred authors and subject matter, are maintained by the system.

69. The system of claim 63, wherein the system provides tabulated information to said user identifying queries made by others of the community of online users, and a ranking of the same based on a frequency of occurrence.

70. An internet message board system associated with a community of online users and a plurality of information categories including one or more individual securities related categories, the system comprising:
- a first routine executing on a first computer associated with the system for receiving and processing electronic messages posted by the community of online users for inclusion in the one or more individual securities related categories;
- a second routine executing on said first computer for sorting and storing said electronic messages so that they are searchable by at least some of said community of online users according to the one or more individual securities related categories;
- a third routine also executing on said third computer associated with the system, said third routine interacting with the community of online users and being configured:
  - (i) for receiving a first user query associated with the one or more individual securities related categories provided within a user query interface, said user query interface operating within a client computer system separate from said first computer; and wherein said first user query can include a category search request for all electronic messages relating to a particular security based on selecting a single predefined search parameter provided within the interface and/or an additional user specified option to be used for filtering electronic messages otherwise falling within said category search request;
  - (ii) for locating a selected first set of electronic messages in response to said first user query; and
  - (iii) for transmitting such first selected set of electronic messages to said user query routine interface; and
  - (iv) for providing a visual chart of a securities trading price in response to a chart request provided within the user query routine interface for a chart related to a particular security;
  - (v) for interacting with an author filtering tool provided within the user query routine interface so that electronic messages originating from a particular author can be selectively not displayed within said user query routine interface;
  - (vi) for receiving a favorite status indicator from said user query routine interface specifying a particular author and/or a particular security as a favorite to be followed by the user of said user query routine interface;
- wherein any electronic messages associated with a particular author and/or a particular security identified with a favorite status indicator can be retrieved as a set using a single predefined search parameter provided within the user query routine interface.

71. The system of claim 70, wherein the system also provides tabulation data for review by the community of online users, including a listing of most popular authors of electronic messages, and/or most popular message boards for a particular security.

72. The system of claim 71, wherein the system also provides feedback information to said user identifying queries made by others of the community of online users, and a ranking of the same based on a frequency of occurrence.

73. The system of claim 70, wherein individual preferences of each of the community of online users, including preferred authors and subject matter, are maintained by the system.

74. A method of handling message item postings and queries made to an electronic message board system, the method comprising the steps of:

(a) storing message items so that they are searchable by users accessing the message board system based on a plurality of predefined information categories;

(b) configuring a user interface for said users when such users access the message board system such that said plurality of predefined information categories are set up as filter selection items within said interface;

(c) receiving a user query received from said user interface based on at least one of said filter selection items;

(d) locating a set of electronic message items on the message board system corresponding to said user query;

(e) transmitting such set of electronic message items to said user so that they can be perceived simultaneously with said filter selection items within said interface by said user;

(f) processing a user posting, which user posting contains a user electronic message item that is processed based on one or more of said filter selection items associated with said user posting;

(g) tabulating said filter selection items associated with said user posting to generate statistical information concerning said predefined information categories.

75. A method of handling message item postings and queries made to an electronic message board system, the method comprising the steps of:

(a) storing message items so that they are searchable by users accessing the message board system based on a plurality of predefined information categories;

(b) configuring a user interface for said users when such users access the message board system such that said plurality of predefined information categories are set up as filter selection items within said interface;

(c) receiving a user query received from said user interface based on at least one of said filter selection items;

(d) locating a set of electronic message items on the message board system corresponding to said user query;

(e) transmitting such set of electronic message items to said user so that they can be perceived simultaneously with said filter selection items within said interface by said user;

(f) processing a user posting, which user posting contains a user electronic message item that is processed based on one or more of said filter selection items associated with said user posting;

(g) tabulating said filter selection items associated with said user posting to generate statistical information concerning said predefined information categories;

(h) processing a user command associated with one or more of said electronic message items taken from said set of electronic message items, which user command results in said statistical information being transmitted and perceived within said interface by said user.

76. A method of managing message items on an electronic message board system, the method comprising the steps of:

(a) classifying first message items using a first set of predefined information categories, which first set of predefined information categories are searchable by users accessing the message board system;

(b) configuring a user interface for said users when any of such users access the message board system such that said first set of predefined information categories are set up as a first set of filter selection items within said interface;

(d) further configuring, on a user by user basis, said user interface to include a second set of filter selection items within said interface based on preferences of said user;

(e) receiving a user query received from said user interface based on at least one of said first and/or second sets of filter selection items;

(f) locating a set of electronic message items on the message board system corresponding to said user query;

(g) transmitting such set of electronic message items to said user;

wherein said second set of filter selection items are associated with a customized set of categories selected by said user based on particular information items requested by said user, and which second set of filter items do not include any of said first set of filter items such that said user can locate second message items using a second set of predefined information categories, which second message items are separate from said first message items.

* * * * *